United States Patent
Emery et al.

(10) Patent No.: US 11,138,388 B2
(45) Date of Patent: Oct. 5, 2021

(54) METHOD AND SYSTEM FOR FACILITATING A USER-MACHINE CONVERSATION

(71) Applicant: Yahoo Holdings, Inc., Sunnyvale, CA (US)

(72) Inventors: Michael Emery, Scotts Valley, CA (US); Lavanya Colinjivadi Viswanathan, Sunnyvale, CA (US)

(73) Assignee: Verizon Media Inc., New York, NY (US)

(*) Notice: Subject to any disclaimer, the term of this patent is extended or adjusted under 35 U.S.C. 154(b) by 460 days.

(21) Appl. No.: 15/388,315

(22) Filed: Dec. 22, 2016

(65) Prior Publication Data

US 2018/0181558 A1 Jun. 28, 2018

(51) Int. Cl.
 *G06F 40/35* (2020.01)
 *H04L 12/58* (2006.01)
 *H04M 3/493* (2006.01)
 *G06F 16/33* (2019.01)
 *G06F 16/332* (2019.01)

(52) U.S. Cl.
 CPC .......... *G06F 40/35* (2020.01); *G06F 16/3329* (2019.01); *G06F 16/3346* (2019.01); *H04L 51/02* (2013.01); *H04M 3/4936* (2013.01)

(58) Field of Classification Search
 CPC .............. G06F 17/279; G06F 16/3346; G06F 16/3329
 See application file for complete search history.

(56) References Cited

U.S. PATENT DOCUMENTS

| | | | | |
|---|---|---|---|---|
| 6,425,012 | B1* | 7/2002 | Trovato | H04L 12/1818 348/E7.071 |
| 2004/0205772 | A1* | 10/2004 | Uszok | H04L 29/06 719/317 |
| 2005/0015350 | A1* | 1/2005 | Foderaro | G06N 3/004 706/20 |
| 2009/0063675 | A1* | 3/2009 | Faris | H04L 67/12 709/224 |
| 2010/0063797 | A1* | 3/2010 | Cong | G06F 16/367 704/9 |
| 2011/0078105 | A1* | 3/2011 | Wallace | G06N 5/047 706/47 |
| 2012/0041903 | A1* | 2/2012 | Beilby | G06N 3/004 706/11 |
| 2013/0346496 | A1* | 12/2013 | Maarek | G06Q 50/01 709/204 |
| 2014/0358631 | A1* | 12/2014 | Ghose | G06Q 30/0201 705/7.29 |
| 2016/0044380 | A1* | 2/2016 | Barrett | H04N 21/812 725/53 |
| 2016/0094490 | A1* | 3/2016 | Li | H04L 51/02 709/206 |

(Continued)

*Primary Examiner* — Michael N Opsasnick
(74) *Attorney, Agent, or Firm* — Venable LLP

(57) ABSTRACT

The present teaching relates to facilitating a user-machine conversation. In one example, a query is obtained from a user. The query is directed to a first conversational bot. A reply in response to the query is obtained from the first conversational bot. A degree of validity of the reply is determined based on the reply and the query. A second conversational bot is determined based on the query and the degree of validity. The conversation is directed to the second conversational bot with the query.

19 Claims, 15 Drawing Sheets

(56) References Cited

U.S. PATENT DOCUMENTS

| | | | |
|---|---|---|---|
| 2016/0285798 A1* | 9/2016 | Smullen | H04L 51/046 |
| 2016/0295018 A1* | 10/2016 | Loftus | H04M 3/5175 |
| 2017/0269972 A1* | 9/2017 | Hosabettu | G06F 9/4843 |
| 2017/0293681 A1* | 10/2017 | Blandin | G06F 40/40 |
| 2017/0324867 A1* | 11/2017 | Tamblyn | H04M 3/5191 |
| 2018/0150524 A1* | 5/2018 | Anger | G06F 16/9535 |
| 2018/0174222 A1* | 6/2018 | Venkatakrishnan | G06Q 30/0633 |

* cited by examiner

METHOD AND SYSTEM FOR FACILITATING A USER-MACHINE CONVERSATION

BACKGROUND

1. Technical Field

The present teaching relates to methods, systems, and programming for Internet services. Particularly, the present teaching is directed to methods, systems, and programming for facilitating a user-machine conversation.

2. Discussion of Technical Background

The era of conversational agents has arrived: every major mobile operating system now comes with a conversational agent, which may be used to communicate with users. In addition, many businesses do not typically provide live chat customer support or service operators to assist their Internet customers. In such cases, a conversational agent, which may be an automated dialog bot or chatbot, might be used to communicate with customers. A chatbot may be a computer program designed to simulate an intelligent conversation with one or more human users via auditory or textual methods, for various practical purposes such as personalized service or information acquisition.

Current conversational bots are difficult to be discovered. Bot stores on major platforms have primitive search, without classifying what the bots are capable of. A bot may be developed to answer questions in a specific domain. However, the bot will falter when it is asked an out of domain question and miss an opportunity for cross promotion.

As more and more domain-specific bots are launched, it becomes difficult for users to discover an appropriate bot for their current use case. Making a bot that can handle all types of intents equally well is a very challenging problem that no company has currently solved.

Therefore, there is a need to provide an improved solution for facilitating conversations between users and conversational bots to solve the above-mentioned problems.

SUMMARY

The present teaching relates to methods, systems, and programming for Internet services. Particularly, the present teaching is directed to methods, systems, and programming for facilitating a user-machine conversation.

In one example, a method, implemented on a machine having at least one processor, storage, and a communication platform capable of connecting to a network for facilitating a user-machine conversation is disclosed. A query is obtained from a user. The query is directed to a first conversational bot. A reply in response to the query is obtained from the first conversational bot. A degree of validity of the reply is determined based on the reply and the query. A second conversational bot is determined based on the query and the degree of validity. The conversation is directed to the second conversational bot with the query.

In a different example, a system having at least one processor, storage, and a communication platform capable of connecting to a network for facilitating a user-machine conversation is disclosed. The system includes a user request analyzer configured for obtaining a query from a user, wherein the query is directed to a first conversational bot; a bot reply analyzer configured for obtaining, from the first conversational bot, a reply in response to the query and determining a degree of validity of the reply based on the reply and the query; a conversational bot recommender configured for determining a second conversational bot based on the query and the degree of validity; and a conversational bot determiner configured for directing the conversation to the second conversational bot with the query.

Other concepts relate to software for implementing the present teaching on facilitating a user-machine conversation. A software product, in accord with this concept, includes at least one machine-readable non-transitory medium and information carried by the medium. The information carried by the medium may be executable program code data, parameters in association with the executable program code, and/or information related to a user, a request, content, or information related to a social group, etc.

In one example, a machine-readable, non-transitory and tangible medium having information recorded thereon for facilitating a user-machine conversation is disclosed. The information, when read by the machine, causes the machine to perform the following: obtaining a query from a user, wherein the query is directed to a first conversational bot; obtaining, from the first conversational bot, a reply in response to the query; determining a degree of validity of the reply based on the reply and the query; determining a second conversational bot based on the query and the degree of validity; and directing the conversation to the second conversational bot with the query.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
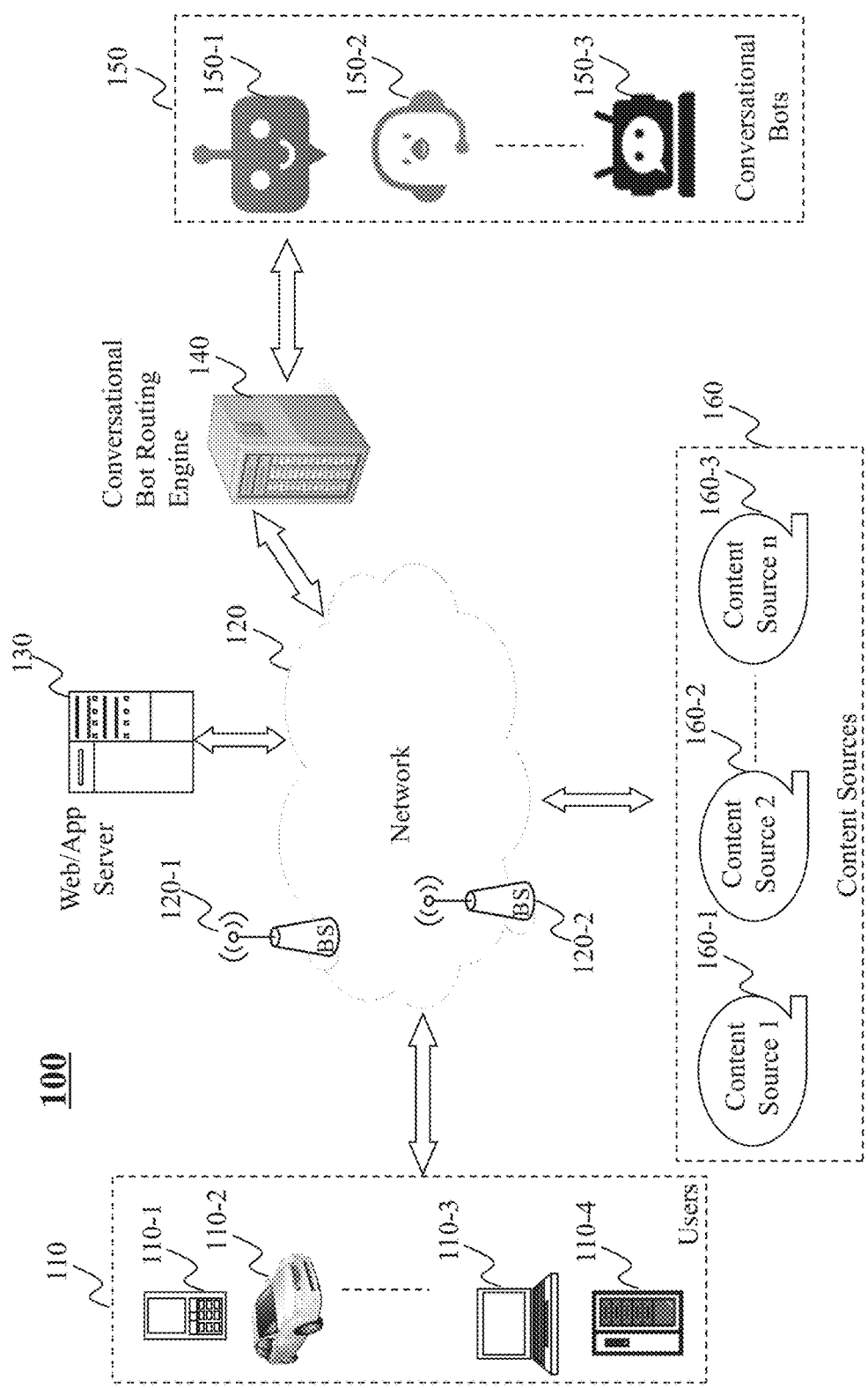
FIG. 1 is a high level depiction of an exemplary networked environment for facilitating a user-machine conversation, according to an embodiment of the present teaching.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, systems, components, and/or circuitry have been described at a relatively high-level, without detail, in order to avoid unnecessarily obscuring aspects of the present teachings.

The present disclosure describes method, system, and programming aspects of facilitating conversations between users and conversational bots. The method and system as disclosed herein aim at improving a user's dialog experience with a conversational bot. An interactive dialog, also known as a chat session, may begin between a user and the conversational bot. The chat session allows the user to receive answers to inquiries and receive information from the conversational bot.

While creating an omnipotent bot that can handle all types of user intents equally well is very challenging, it is critical to handle bot selection and bot recommendation effectively, especially when a user picks an inappropriate bot or when a user changes topic during a conversation with a pre-selected bot. In practice, as more and more domain-specific bots are launched, it becomes difficult for a user to discover an appropriate bot at the first place.

According to various embodiments of the present teaching, a system is disclosed to redirect a user to an appropriate bot when a conversation between the user and a current bot is out of domain of the current bot. In one example, the system can capture, for all bot traffic, user utterance, replies from the bot, a list of intents that the bot considered for that utterance, and the specific use case within the selected intent. The system can choose a set of expert intents per bot and examples for each of the intents across bots heuristically.

A machine learning model may be trained with the per-bot expert intents. Once trained, the model is capable of associating an utterance with a bot that can handle that utterance appropriately. For a given user utterance and bot reply, the system can apply a ranking function to determine whether the current bot response is appropriate and/or whether the system should refer the user to a new bot recommended based on the model.

The disclosed approach can allow bots to be cross promoted and be discovered organically without any effort on the part of the bot developer. Developers do not have to spend effort developing comprehensive out of domain coverage of utterances. The disclosed method can also allow developers to focus on creating bots that do a limited set of things really well. With the well-developed domain-specific bots and the disclosed scheme for selecting and recommending best bots for users, the system can provide users best user experience during user-machine conversations. The users can get satisfactory results for queries and are able to find more bots relevant to their interests.

The terms "conversational bot," "chatbot" and "bot" may be used interchangeably herein.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

FIG. 1 is a high level depiction of an exemplary networked environment 100 for facilitating a user-machine conversation, according to an embodiment of the present teaching. In FIG. 1, the exemplary networked environment 100 includes one or more users 110, a network 120, a web/app server 130, a conversational bot routing engine 140, conversational bots 150, and content sources 160. The network 120 may be a single network or a combination of different networks. For example, the network 120 may be a local area network (LAN), a wide area network (WAN), a public network, a private network, a proprietary network, a Public Telephone Switched Network (PSTN), the Internet, a wireless network, a virtual network, or any combination thereof. The network 120 may also include various network access points, e.g., wired or wireless access points such as base stations or Internet exchange points 120-1 . . . 120-2, through which a data source may connect to the network 120 in order to transmit information via the network 120.

Users 110 may be of different types such as users connected to the network 120 via desktop computers 110-4, laptop computers 110-3, a built-in device in a motor vehicle 110-2, or a mobile device 110-1. In one embodiment, users 110 may be connected to the network 120 and able to interact with the web/app server 130 and the conversational bot routing engine 140 through wired or wireless technologies and related operating systems implemented within user-wearable devices (e.g., glasses, wrist watch, etc.).

A user, e.g., the user 110-1, may access a website or application provided by the web/app server 130 via the network 120 and communicate with the conversational bot routing engine 140 via a user interface embedded on the website or the application. It can be understood by one skilled in the art that while FIG. 1 describes a web-based or app-based server, the disclosed methods in the present teaching can also be applied on other types of conversational bots, e.g. a conversational bot located on a local device of the user.

The conversational bot routing engine 140 may communicate with the user to enable efficient, natural task-oriented interactions between the user and one or more bots. In one embodiment, the conversational bot routing engine 140 may receive a request from the web/app server 130, or directly from the user, for starting an online dialog with the user. The online dialog, also known as a chat session, may allow the user to receive answers to inquiries and receive information from a bot via the conversational bot routing engine 140. The bot may be selected by the user or a default bot recommended to the user based on historical data of the user, before the conversation begins. For example, the conversational bot routing engine 140 may forward a query from the user to a user-specified bot, and forward a reply from the user-specified bot back to the user. In one situation, when the conversational bot routing engine 140 determines that a reply provided by the user-specified bot is a valid answer to the query, the conversational bot routing engine 140 may recommend a new bot to the user and/or re-direct the user to the new bot to continue the conversation. This may happen when the user-specified bot provides a reply that reflects an ignorance of the bot regarding the query, e.g. a reply like "I don't know" or a non-sense reply that deviates from the query.

The conversational bot routing engine 140 may store and train a bot recommendation model for dynamically selecting a bot that can best answer a given query from a user. The bot recommendation model may be generated by one or more different applications (not shown), which may be running on the conversational bot routing engine 140, at the backend of the conversational bot routing engine 140, or as a completely standalone system capable of connecting to the network 120, accessing information from different sources, analyzing the information, generating structured information, and storing such generated information in the conversational bot routing engine 140.

The conversation bots 150 are independent from each other. Each of the conversation bots 150 has its own expertise on one or more topics and has been trained based on its own model and data independent of other bots. When one of the conversation bots 150 receives a query out of its domain, e.g. when a weather bot receives a question about restaurants, the bot does not have a valid answer to the query and does not know whether or which of the other bots can provide a valid answer. In this case, the conversational bot routing engine 140 can help to determine an appropriate bot to answer this query.

In one embodiment, the conversational bot routing engine 140 may receive, from a current bot, a reply in response to a query from a user. The conversational bot routing engine 140 may determine a degree of validity of the reply based on the query, the user, the reply, and/or a confidence score associated with the reply provided by the current bot. When the degree of validity exceeds a threshold, the conversational bot routing engine 140 may forward the reply to the user. Otherwise, when the degree of validity does not exceed the threshold, the conversational bot routing engine 140 may select a new bot to provide a better reply for the query.

In one example, the conversational bot routing engine 140 may recommend the new bot to the user and allow the user to determine whether to be directed to the new bot for conversation. In another example, the conversational bot routing engine 140 may automatically redirect the user to the new bot and provide a reply from the new bot to the user as a response to the query.

In one situation, after the conversational bot routing engine 140 determines that the degree of validity does not exceed the threshold, the conversational bot routing engine 140 determines that none of the existing bots can provide a better reply to the query, or none of the existing bots can provide a reply with a degree of validity higher than a predetermined threshold. In this situation, the conversational bot routing engine 140 may still forward the reply from the current bot to the user. In addition, the conversational bot routing engine 140 may generate a new bot to fit the query, either by itself or by a third party.

The content sources 160 in the exemplary networked environment 100 include multiple content sources 160-1, 160-2 . . . 160-3. A content source 160 may correspond to a website hosted by an entity, whether an individual, a business, or an organization such as USPTO.gov, a content provider such as cnn.com and Yahoo.com, a social network website such as Facebook.com, or a content feed source such as tweeter or blogs. The web/app server 130 may access information from any of the content sources 160-1, 160-2 . . . 160-3. For example, the web/app server 130 may fetch content, e.g., websites, through its web crawler to build a search index.

Figure 2:
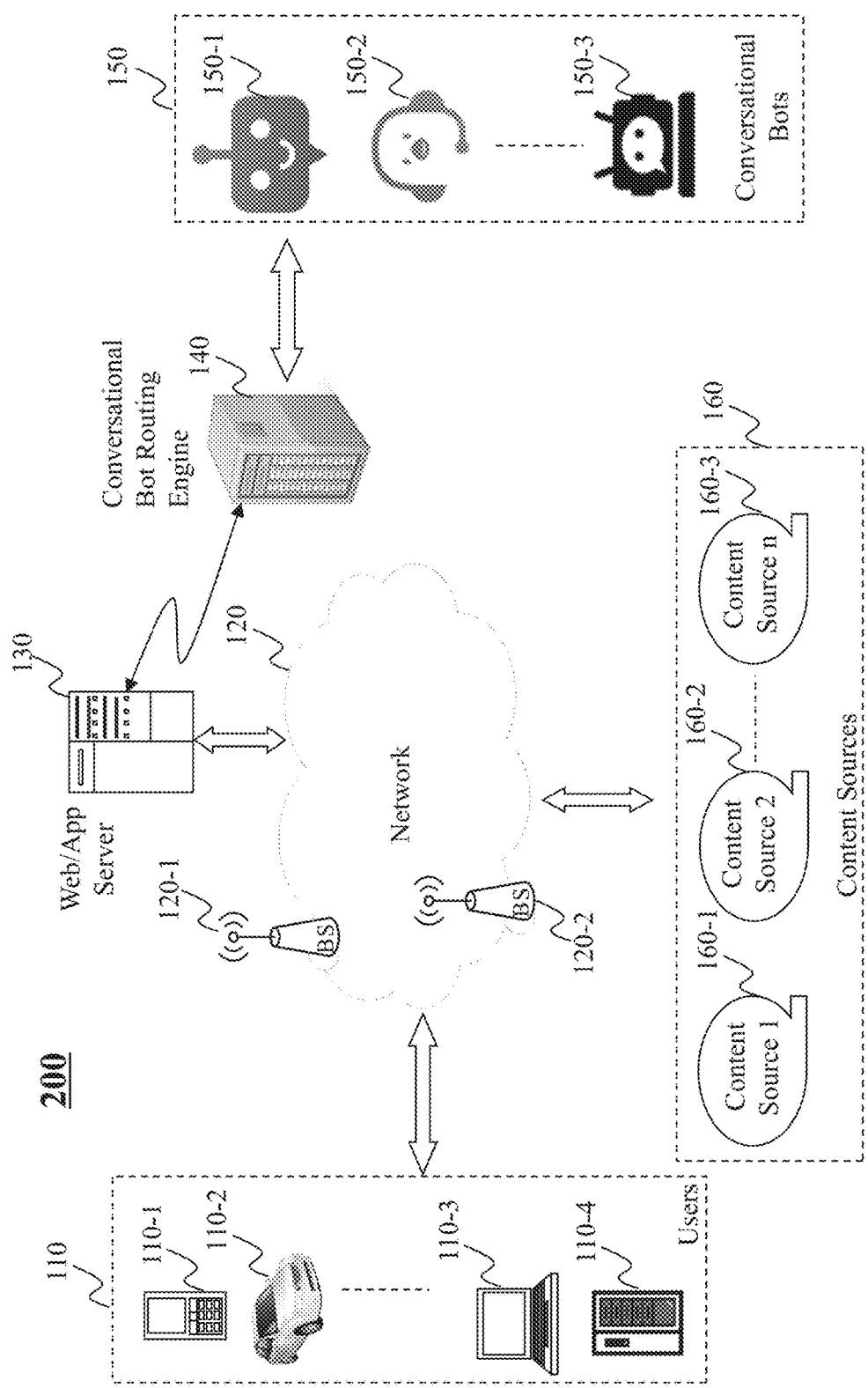
FIG. 2 is a high level depiction of another exemplary networked environment for facilitating a user-machine conversation, according to an embodiment of the present teaching.

FIG. 2 is a high level depiction of another exemplary networked environment 200 for facilitating a user-machine conversation, according to an embodiment of the present teaching. The exemplary networked environment 200 in this embodiment is similar to the exemplary networked environment 100 in FIG. 1, except that the conversational bot routing engine 140 serves as a backend system for the web/app server 130.

Figure 3:
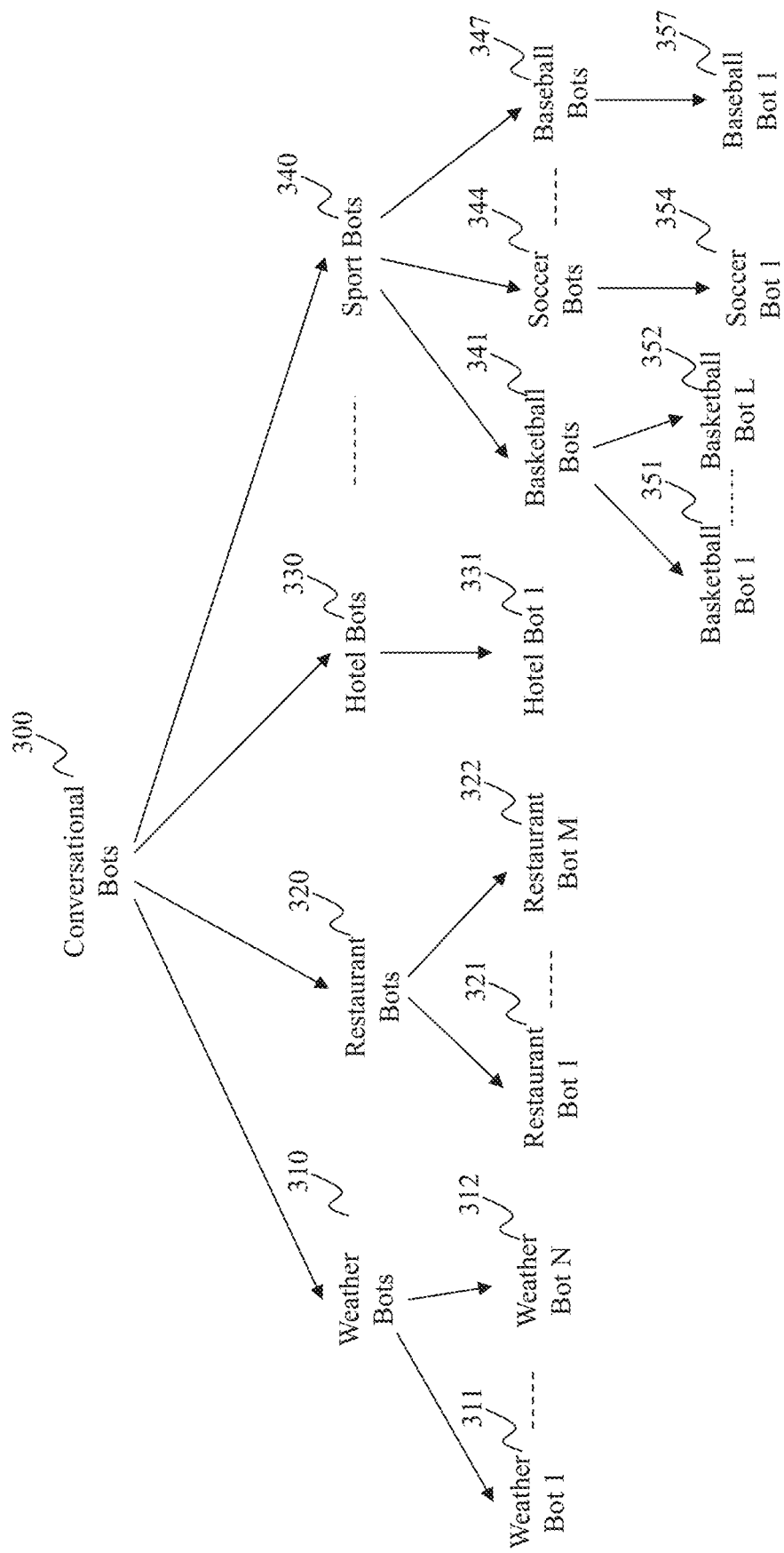
FIG. 3 illustrates various exemplary bots specialized in different categories, according to an embodiment of the present teaching.

FIG. 3 illustrates various exemplary bots specialized in different categories, according to an embodiment of the present teaching. A bot may be an expert in a topic or domain. A domain may correspond to one or more bots that are experts in that domain. For example, as shown in FIG. 3, there are various domain-specific bots 300: weather bots 310, restaurant bots 320, hotel bots 330, sport bots 340, etc. Under each category, there may be one or more subcategories. For example, the sport bots 340 may include basketball bots 341, soccer bots 344, baseball bots 347, etc.

While there are many categories of the bots, there can be multiple bots in a same domain. For example, there may be N weather bots 311, 212; and there may be M restaurant bots 321, 322. As such, it is time-consuming and difficult for a user to understand these bots and pick a proper bot to start a conversation. Even if the user does select a proper bot to start the conversation, the user may want to change topic of discussion during the conversation. Therefore, it is important to dynamically select a proper bot for the user to improve user experience and promote or advertise the existing bots.

Figure 4:
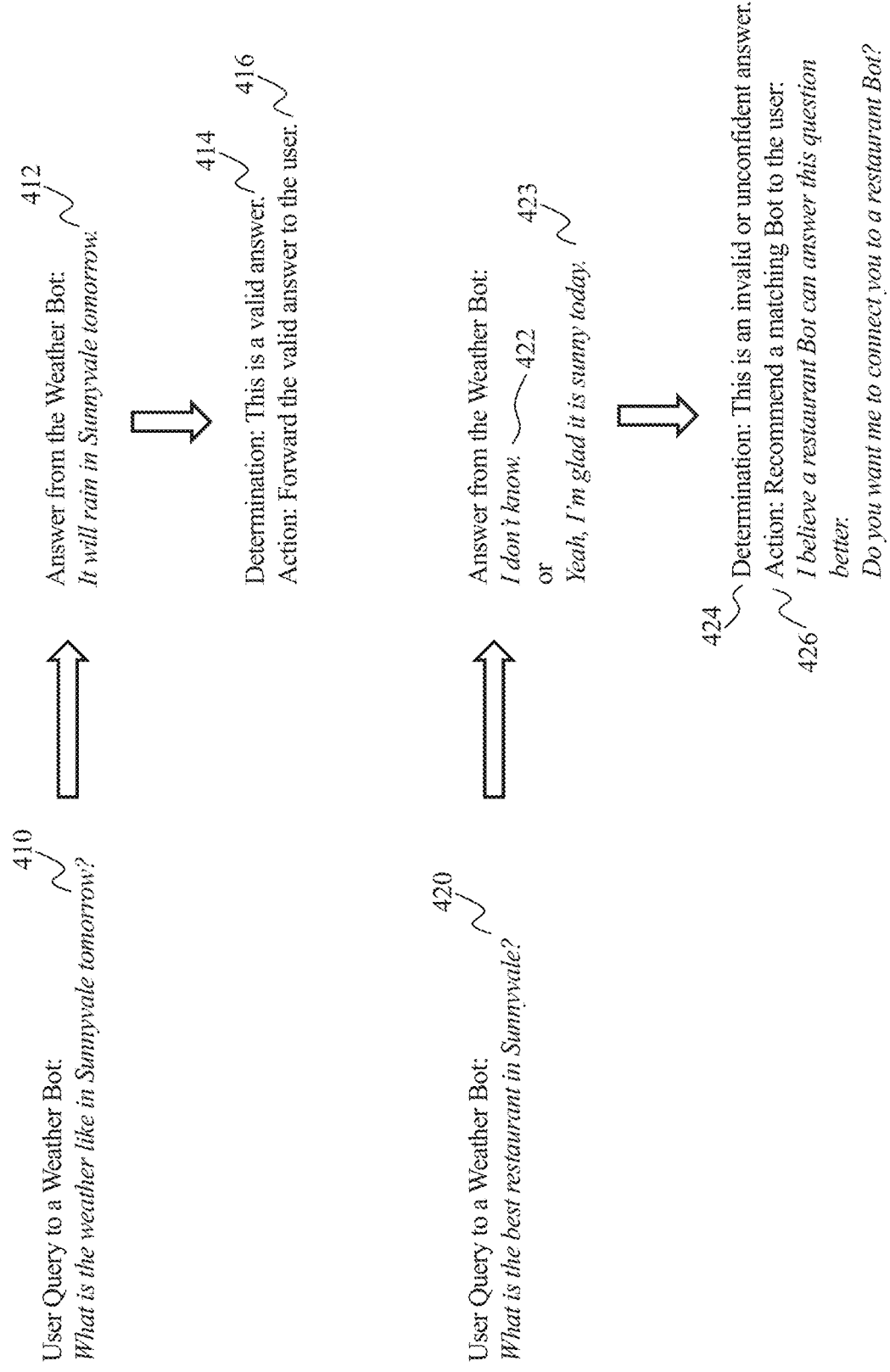
FIG. 4 illustrates exemplary queries and replies between a user and a bot, and corresponding actions taken by a conversational bot routing engine, according to an embodiment of the present teaching.

FIG. 4 illustrates exemplary queries and replies between a user and a bot, and corresponding actions taken by a conversational bot routing engine, according to an embodiment of the present teaching.

In one example, as shown in FIG. 4, a user submits a query 410 to a weather bot, where the query 410 is: What is the weather like in Sunnyvale tomorrow? In response, the weather bot replied 412: It will rain in Sunnyvale tomorrow. After obtaining this reply 412, the conversational bot routing engine can make a determination 414 that the reply 412 is a valid answer, in view of the query 410. As such, the conversational bot routing engine can take an action 416 of forwarding the valid answer 412 to the user.

In another example, as shown in FIG. 4, a user submits a query 420 to a weather bot, where the query 420 is: What is the best restaurant in Sunnyvale? Because this is a question out of domain of the weather bot, the weather bot may provide a reply like "I don't know" 422 or "Yeah, I'm glad it is sunny today" 423. After obtaining this kind of reply, the conversational bot routing engine can make a determination 424 that the reply is an invalid or unconfident, based on some threshold, in view of the query 420. As such, the conversational bot routing engine may take an action 426 of recommending a new matching bot to the user, e.g. by informing the user: "I believe a restaurant Bot can answer this question better. Do you want me to connect you to a restaurant Bot?" In one embodiment, the conversational bot routing engine can automatically redirect the user to the restaurant Bot without asking the user. In that case, the user can quickly receive an answer to an out-of-domain question, during a domain specific conversation.

Figure 5:
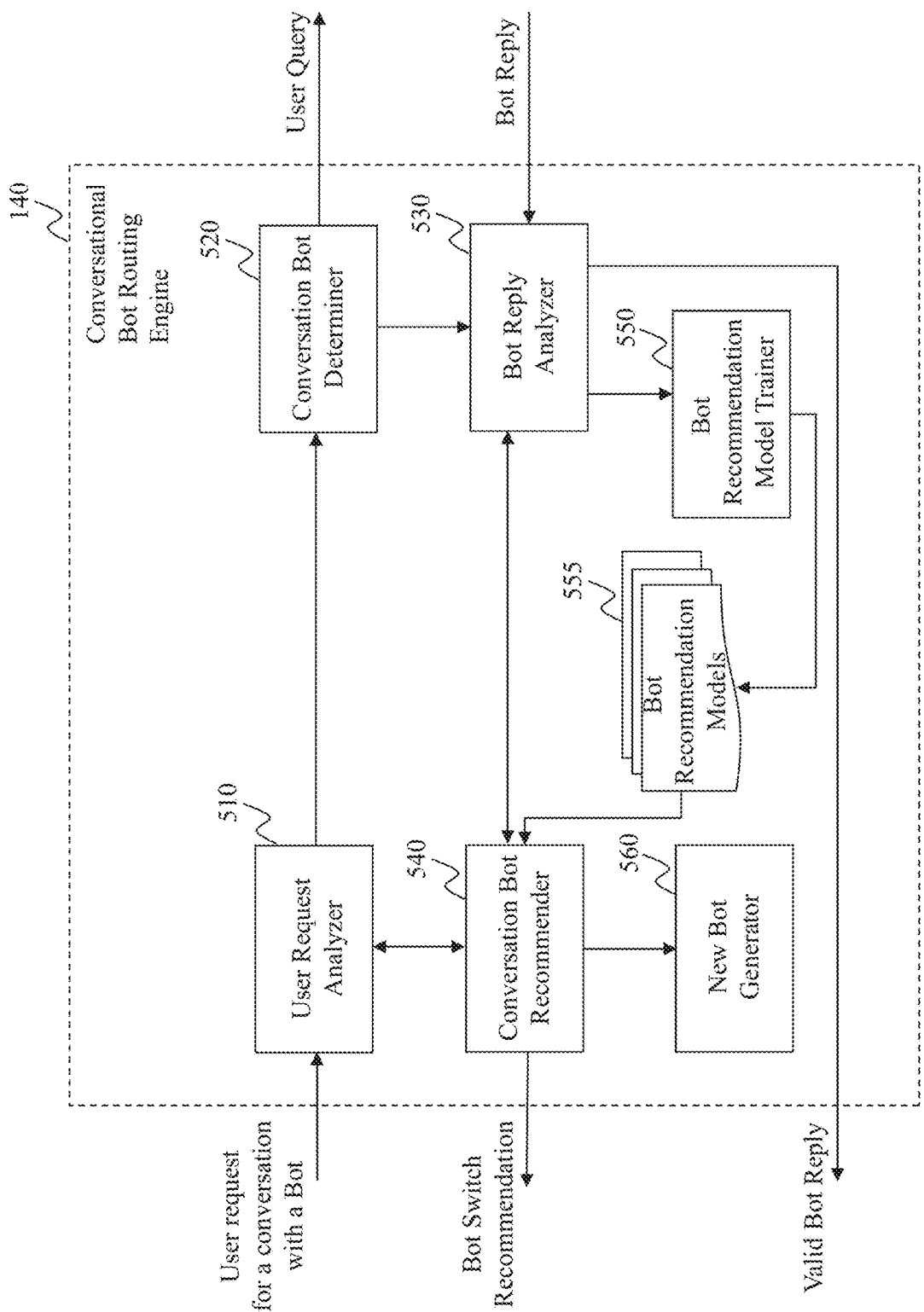
FIG. 5 illustrates an exemplary diagram of a conversational bot routing engine, according to an embodiment of the present teaching.

FIG. 5 illustrates an exemplary diagram of a conversational bot routing engine 140, according to an embodiment of the present teaching. The conversational bot routing engine 140 in this example includes a user request analyzer 510, a conversation bot determiner 520, a bot reply analyzer 530, a conversation bot recommender 540, a bot recommendation model trainer 550, one or more bot recommendation models 555, and a new bot generator 560.

The user request analyzer 510 in this example may receive a user request for a conversation with a bot. The user request analyzer 510 can analyze the user request to determine a user query and/or other related information. In one embodiment, the other related information in the user request may indicate that the user query should be directed to a bot that is specified by the user with the user request. The user may specify the bot based on a domain of the bot. For example, the user may select a weather bot to have a conversation about weather, or select a sport bot to have a discussion about some sports. In one case, the user may select a bot based on a previous recommendation from the conversational bot routing engine 140, with details to be discussed later. The user request analyzer 510 can send the user query and the other related information to the conversation bot determiner 520 for determining the user-specified bot, and to the conversation bot recommender 540 for recommending a better matching bot if needed.

The conversation bot determiner 520 in this example may determine the user-specified bot based on information forwarded by the user request analyzer 510, and send the user query to the user-specified bot for the conversation.

In one embodiment, the user may start a conversation without specifying a bot, or choose to discuss with a random bot. In this case, the conversation bot determiner 520 may determine a default bot and send the user query to the default bot. The default bot may be determined based on a random selection, a selection based on bot availability, user query, and/or bot popularity.

In another embodiment, the user may request the conversational bot routing engine 140 to select a proper bot for a conversation. In this case, the user request analyzer 510 may forward a bot selection request extracted from the user request to the conversation bot recommender 540, for recommending a bot to the user, e.g. based on the user query.

The conversation bot determiner 520 in this example may send the information of the user-specified bot or the default bot to the bot reply analyzer 530 for analyzing bot replies.

The bot reply analyzer 530 in this example may receive bot replies from various bots. For each bot reply, the bot reply analyzer 530 can determine its corresponding user query based on information received from the conversation bot determiner 520. The bot reply analyzer 530 may also receive a confidence score associated with the bot reply from the bot. The confidence score may indicate how confident the bot itself is regarding the reply.

The bot reply analyzer 530 can determine a degree of validity of the bot reply based on the confidence score and/or the corresponding user query. For example, the degree of validity may be low when the reply includes "I don't know" or "I am not sure", which is probably associated with a low confidence score. In another example, the degree of validity may be low when the reply is obviously not in the same domain as the query, e.g. "sunny day here" in reply to "Sunnyvale restaurant." This may be determined by comparing the query and the reply and identifying a potential misunderstanding of the bot.

The bot reply analyzer 530 may determine whether a bot switch is needed for the conversation of the user. When the bot reply analyzer 530 determines that the degree of validity of the reply is below a threshold, the bot reply analyzer 530 may send a bot switch request to the conversation bot recommender 540 for recommending a new bot to the user, e.g. based on the user query. When the bot reply analyzer 530 determines that the degree of validity of the reply is not below the threshold, the bot reply analyzer 530 may forward the valid reply to the user in response to the user query.

In one embodiment, the bot reply analyzer 530 may provide query/reply pairs to the bot recommendation model trainer 550 for training a bot recommendation model. The bot recommendation model will be used for recommending a bot to a user based on a query. A query/reply pair may include a historical query and a historical reply corresponding to the historical query. The historical reply was provided by a conversational bot with an associated confidence score. For example, after the bot reply analyzer 530 forwards a reply received from a bot to a user in response to a corresponding query, the bot reply analyzer 530 may send information about the pair of the forwarded reply and the corresponding query to the bot recommendation model trainer 550 for model training. The information may also include bot information of the corresponding bot.

The conversation bot recommender 540 in this example may receive a bot selection request from the user request analyzer 510 and/or a bot switch request from the bot reply analyzer 530. Based on either of the requests, and a corresponding query, the conversation bot recommender 540 can determine one or more matching bots using one of the bot recommendation models 555. A bot recommendation model may be used to map some features of the query and/or the user to a corresponding bot, based on historical data. The conversation bot recommender 540 may select one of the bot recommendation models 555 for bot recommendation based on user profile information of the user.

The bot recommendation model trainer 550 in this example may collect information about historical query/reply pairs, e.g. from the bot reply analyzer 530, and train the bot recommendation models 555 based on the collected information, e.g. using a machine learning scheme.

The conversation bot recommender 540 may select a new matching bot from the one or more matching bots, e.g. based on confidence scores associated with the matching bots determined by the bot recommendation model. The conversation bot recommender 540 may then recommend the new matching bot to the user. Whether the user selects the recommended new bot or not, the user can be informed about the existence of the better matching bot to the query. This can help cross promotion on different bots. In one embodiment, the conversation bot recommender 540 may automatically redirect the user's conversation, including the current query, to the new matching bot for reply.

In one embodiment, the conversation bot recommender 540 may determine that no other bots can provide a better reply than the obtained reply, e.g. based on the bot recommendation model. In this case, the conversation bot recommender 540 may inform the bot reply analyzer 530 to provide the received bot reply to the user although its degree of validity is below a predetermined threshold. In addition, the conversation bot recommender 540 may send a request to the new bot generator 560 for generating a new bot.

The new bot generator 560 in this example may receive the request from the conversation bot recommender 540 and generate a new bot based on the query. In one embodiment, the new bot generator 560 may be located at a third party other than the conversational bot routing engine 140. The newly generated bot can be published to the user such that next time the user can select the new bot for conversation. In one example, the new bot will be added to a total list of bots stored in the conversation bot recommender 540, such that the conversation bot recommender 540 can recommend this new bot to a user when the user submits a query similar to the query based on which the new bot was generated.

Figure 6:
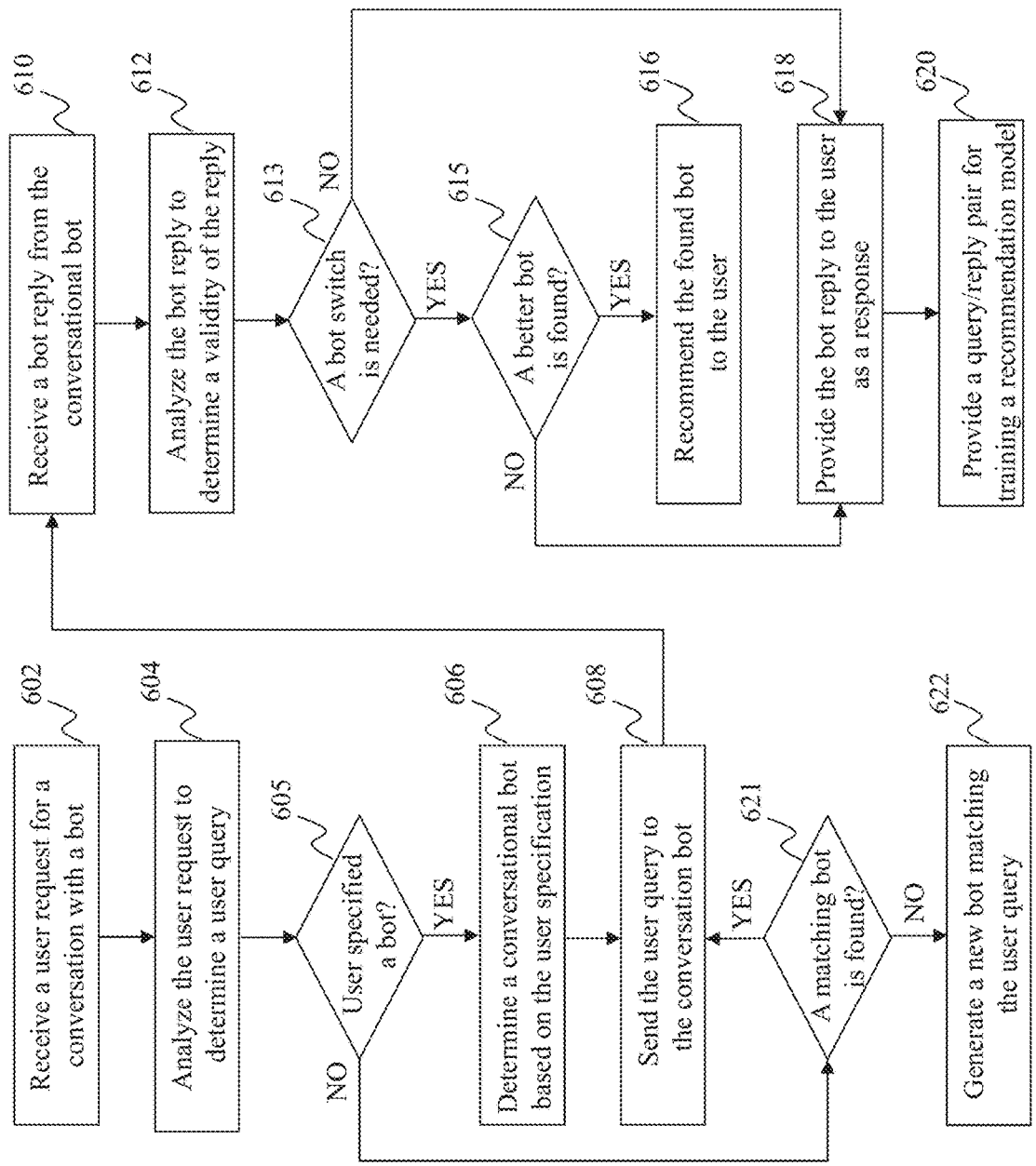
FIG. 6 shows a flowchart of an exemplary process performed by a conversational bot routing engine, according to an embodiment of the present teaching.

FIG. 6 shows a flowchart of an exemplary process performed by a conversational bot routing engine, e.g. the conversational bot routing engine 140 in FIG. 5, according to an embodiment of the present teaching. At 602, a user request is received for a conversation with a bot. The user request is analyzed at 604 to determine a user query.

At 605, it is determined whether the user specified a bot in the user request. If so, the process moves to 606 to determine the bot specified by the user, and then moves on to 608. If not, the process moves to 621, where it is determined whether a matching bot is found. If a matching bot is found, the process moves on to 608. If no matching bot is found, the process moves to 622, where a new bot matching the user query is generated.

At 608, the user query is sent to the bot, which is user specified or a previously found matching bot. A bot reply is received at 610 from the bot. The bot reply is analyzed at 612 to determine a validity of the reply. Then at 613, it is determined whether a bot switch is needed, e.g. based on the validity and a threshold. If a bot switch is needed, the process moves to 615. If no bot switch is needed, the process moves directly to 618.

At 615, it is determined that whether a better bot is found to answer the query, e.g. based on a previously trained bot recommendation model. If so, the process moves to 616, where the better bot is recommended to the user. In one embodiment, at 616, the user query is sent to the better bot for reply, such that the user is automatically redirected to the better bot. If no better bot is found at 615, the process moves to 618.

At 618, the bot reply is provided to the user as a response. At 620, a query/reply pair of the query and the bot reply is provided for training a recommendation model, which can be used for future bot recommendation. In one embodiment, after it is determined at 615 that no better bot is found and after the bot reply from the original bot is provided to the user, the process may go to 622 to generate a new bot matching the user query, which may be done locally or at a third party.

Figure 7:
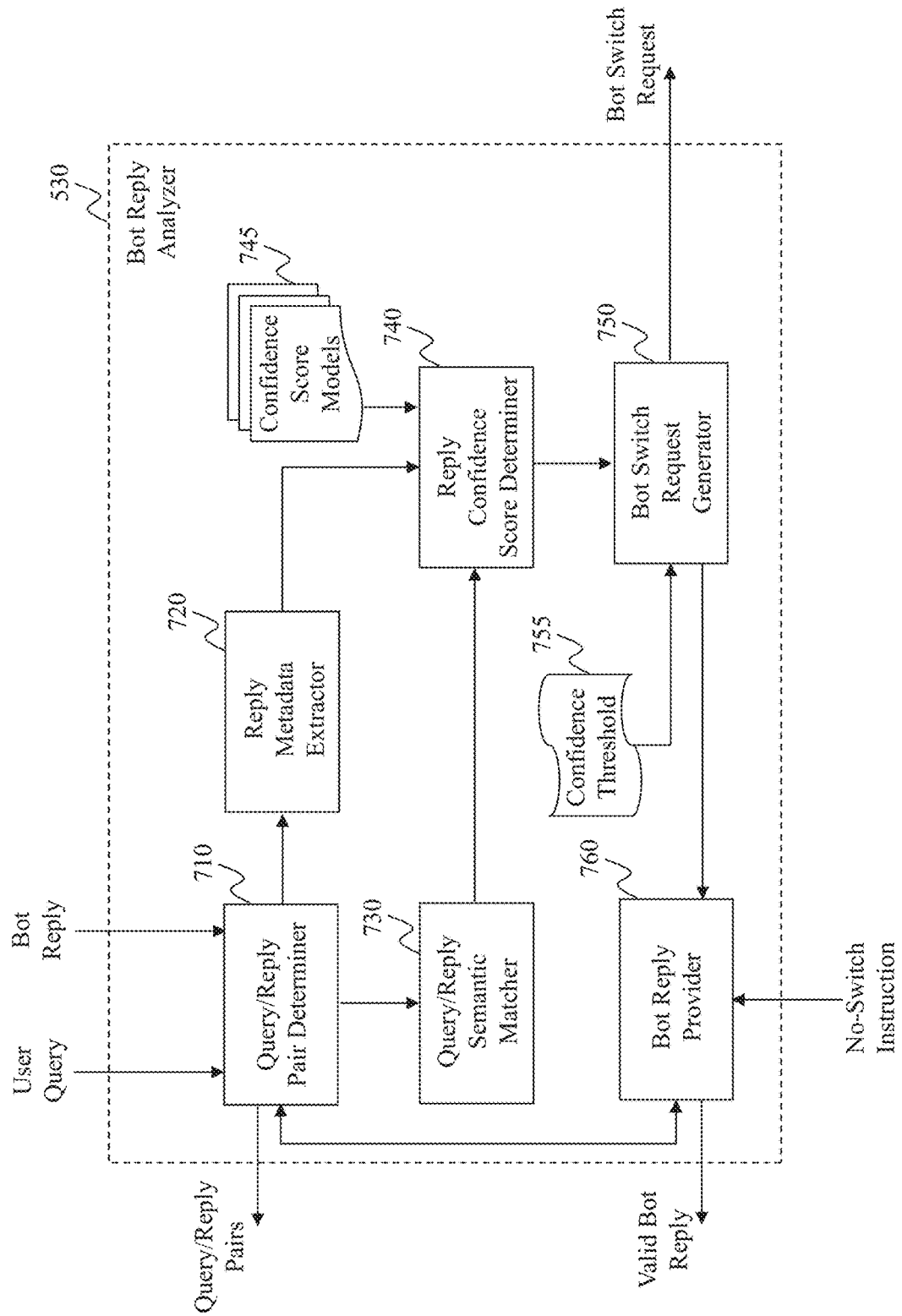
FIG. 7 illustrates an exemplary diagram of a bot reply analyzer, according to an embodiment of the present teaching.

FIG. 7 illustrates an exemplary diagram of a bot reply analyzer 530, according to an embodiment of the present teaching. As shown in FIG. 7, the bot reply analyzer 530 in this example includes a query/reply pair determiner 710, a reply metadata extractor 720, a query/reply semantic matcher 730, a reply confidence score determiner 740, confidence score models 745, a bot switch request generator 750, a confidence threshold 755, and a bot reply provider 760.

The query/reply pair determiner 710 in this example may obtain, e.g. from the conversation bot determiner 520, a user query submitted by a user. The query/reply pair determiner 710 may also obtain a bot reply with metadata from a bot. The query/reply pair determiner 710 can determine that a received bot reply is in response to a corresponding user query, e.g. based on the metadata. The query/reply pair determiner 710 can then pair the received bot reply with the corresponding user query. The query/reply pair determiner 710 may send each query/reply pair to the reply metadata extractor 720 for metadata extraction and to the query/reply semantic matcher 730 for query/reply semantic matching.

The reply metadata extractor 720 in this example may receive information about the query/reply pair from the query/reply pair determiner 710, and extract metadata of the bot reply. The reply metadata extractor 720 can send the extracted metadata to the reply confidence score determiner 740 for determining a confidence score of the bot reply.

The query/reply semantic matcher 730 in this example may receive the information about the query/reply pair from the query/reply pair determiner 710, and determine a degree of matching between the query and the reply, e.g. based on a sematic analysis of the query and the reply. The query/reply semantic matcher 730 may send the degree of matching to the reply confidence score determiner 740 for determining a confidence score of the bot reply.

The reply confidence score determiner 740 in this example may receive the metadata extracted by the reply metadata extractor 720 and the degree of matching from the query/reply semantic matcher 730. The reply confidence score determiner 740 may select one of the confidence score models 745 and determine a confidence score for the bot reply in the pair based on the selected model, the metadata, and/or the degree of matching. In one embodiment, a selected model indicates to determine the confidence score based on the metadata of the reply, which is provided by the bot itself. In this case, the bot itself may provide a confidence score for its own reply in view of the query. In another embodiment, a selected model indicates to determine the confidence score based on the degree of semantic matching between the query and the reply. In yet another embodiment, a selected model indicates to determine the confidence score based on both the degree of semantic matching between the query and the reply and the metadata of the reply. The reply confidence score determiner 740 can send the confidence score to the bot switch request generator 750 for generating a request for bot switch.

The bot switch request generator 750 in this example may receive the confidence score of the reply determined by the reply confidence score determiner 740, and obtain the confidence threshold 755. The confidence threshold 755 may be determined and/or updated by an administrator of the system, or based on detection of environment changes of the system. The bot switch request generator 750 can determine whether a bot switch is needed for answering the query in the pair, based on the confidence score and the confidence threshold 755. For example, the bot switch request generator 750 may compare the confidence score with the confidence threshold 755 and determine that a bot switch is needed when the confidence score is lower than the confidence threshold 755. In this situation, the bot switch request generator 750 can generate and send a bot switch request with metadata to the conversation bot recommender 540 for recommending a new bot to the user. When the confidence score is not lower than the confidence threshold 755, the bot switch request generator 750 may determine that no bot switch is needed, and instruct the bot reply provider 760 to provide the original bot reply to the user.

The bot reply provider 760 in this example may receive an instruction from the bot switch request generator 750 that no bot switched is needed. In this case, the bot reply provider 760 can communicate with the query/reply pair determiner 710 to identify the original bot reply in the pair, and provide the bot reply to the user as a response to the query in the pair.

In one embodiment, the bot reply provider 760 may receive a no-switch instruction from the conversation bot recommender 540. This may happen after the bot switch request generator 750 sends the bot switch request to the conversation bot recommender 540 and the conversation bot recommender 540 determines that no better bot is available for switch. In this case, the bot reply provider 760 can receive a no-switch instruction from the conversation bot recommender 540 to keep the original bot reply. Again, the bot reply provider 760 can communicate with the query/reply pair determiner 710 to identify the original bot reply in the pair, and provide the bot reply to the user as a response to the query in the pair.

In addition, after the bot reply provider 760 sends the reply to the user as a response, the bot reply provider 760 may provide the query/reply pair with metadata for training a bot recommendation model for future bot recommendation. In one embodiment, the bot reply provider 760 may only provide the query/reply pair with metadata for training the bot recommendation model when the reply in the pair is valid, i.e. when the bot reply provider 760 follows the instruction from the bot switch request generator 750 instead the no-switch instruction from the conversation bot recommender 540.

Figure 8:
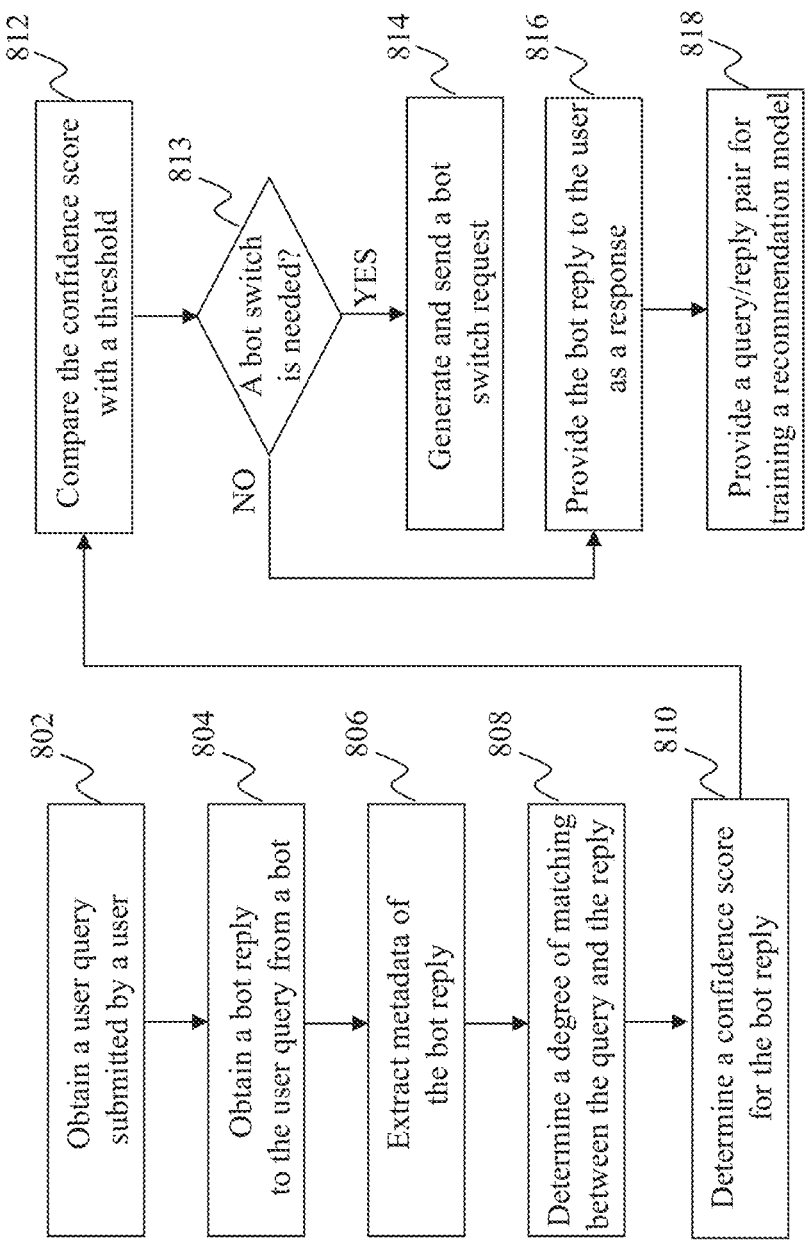
FIG. 8 shows a flowchart of an exemplary process performed by a bot reply analyzer, according to an embodiment of the present teaching.

FIG. 8 shows a flowchart of an exemplary process performed by a bot reply analyzer e.g. the bot reply analyzer 530 in FIG. 7, according to an embodiment of the present teaching. A user query submitted by a user is obtained at 802. A bot reply to the user query is obtained at 804 from a bot. Metadata of the bot reply is extracted at 806. A degree of matching is determined at 808 between the query and the reply. A confidence score is determined at 810 for the bot reply. The confidence score is compared at 812 with a threshold.

It is determined at 813 that whether a bot switch is needed. If so, the process moves to 814, where a bot switch request is generated and sent for bot switch. If not, the process moves to 816, where the bot reply is provided to the user as a response. Then at 818, a query/reply pair of the query and the bot reply is provided with some metadata for training a bot recommendation model for future bot switches.

Figure 9:
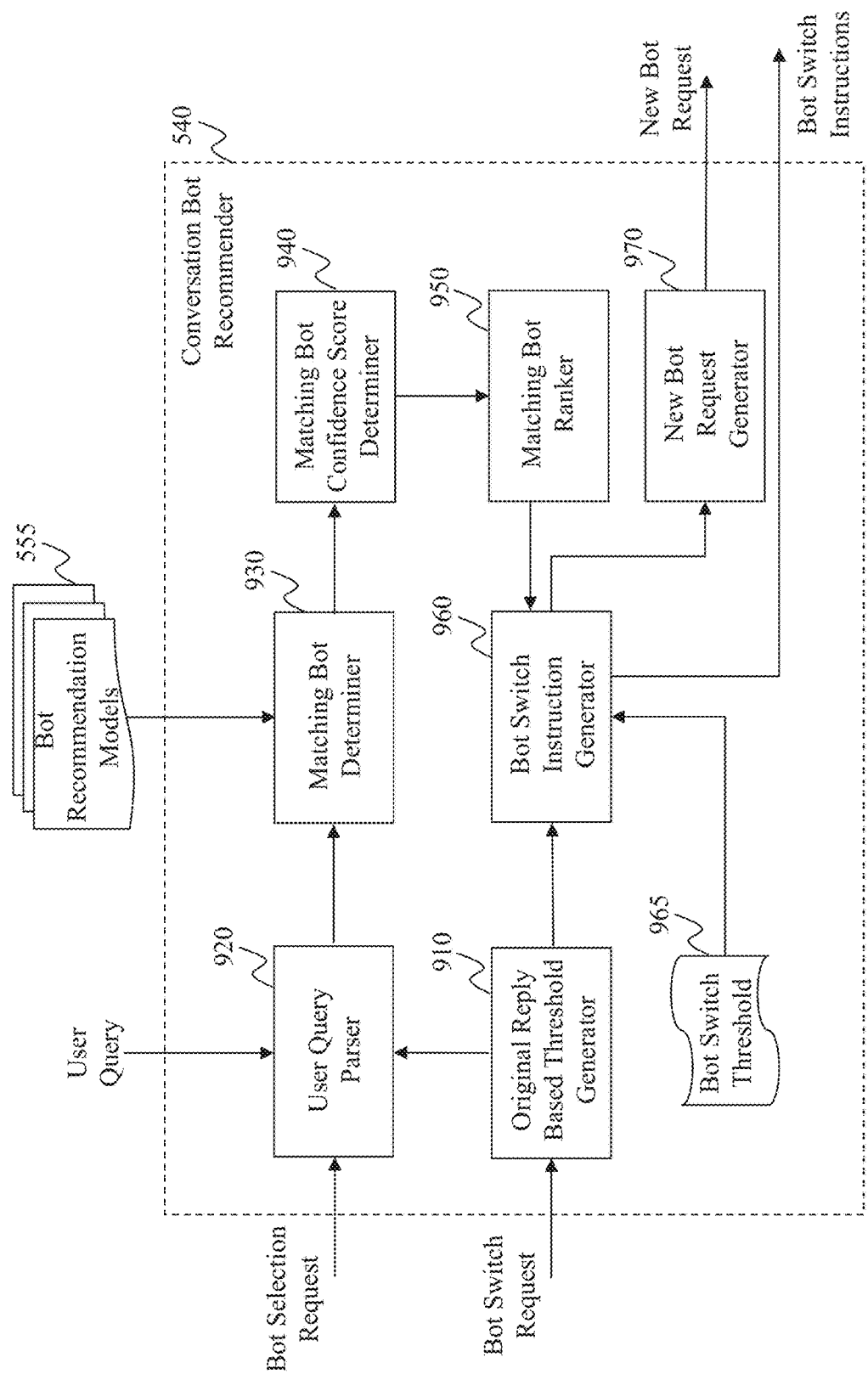
FIG. 9 illustrates an exemplary diagram of a conversational bot recommender, according to an embodiment of the present teaching.

FIG. 9 illustrates an exemplary diagram of a conversational bot recommender 540, according to an embodiment of the present teaching. As shown in FIG. 9, the conversation bot recommender 540 in this example includes an original reply based threshold generator 910, a user query parser 920, a matching bot determiner 930, a matching bot confidence score determiner 940, a matching bot ranker 950, a bot switch instruction generator 960, a bot switch threshold 965, and a new bot request generator 970.

The original reply based threshold generator 910 in this example may receive a bot switch request with metadata from the bot reply analyzer 530. As discussed above, this may happen when the bot reply analyzer 530 determines that an original reply has a confidence score lower that a threshold. The original reply based threshold generator 910 may obtain the confidence score of the original reply based on the metadata and generate a dynamic threshold based on the confidence score. The original reply based threshold generator 910 may send the dynamic threshold to the bot switch instruction generator 960 for bot switch instruction generation. The original reply based threshold generator 910 may also forward the bot switch request to the user query parser 920 and instruct the user query parser 920 for parsing the corresponding user query.

The user query parser 920 in this example may receive a user query from the user request analyzer 510. Upon receiving a bot switch request via the original reply based threshold generator 910, the user query parser 920 can parse the user query to determine one or more features of the query. The bot switch request may indicate a request to find a better matching bot for the query than the current bot which provides the original reply.

In one embodiment, the user query parser 920 may receive a bot selection request from the user request analyzer 510. As discussed before, this may happen when the user starts a conversation or submits a query without specifying a bot. In this case, the bot selection request is for the conversation bot recommender 540 to determine a matching bot for the query without a current bot or an original reply. Again, the user query parser 920 can parse the user query to determine one or more features of the query.

After the user query parser 920 parses the user query to determine one or more features of the query, the user query parser 920 can send the one or more features to the matching bot determiner 930 for matching bot determination.

The matching bot determiner 930 may select one of the bot recommendation models 555 and determine one or more matching bots for the query based on the selected model. A bot recommendation model may be trained based on historical pairs of queries and corresponding valid replies from corresponding bots. The bot recommendation model can be utilized to map a query to one or more matching bots, based on some features of the query. In addition, the bot recommendation model can also be utilized to determine a confidence score for each matching bot.

The matching bot determiner 930 in this example may determine the one or more matching bots based on the one or more features of the query and the selected model. Then, the matching bot determiner 930 can send the one or more matching bots and the selected model to the matching bot confidence score determiner 940 for confidence score determination.

The matching bot confidence score determiner 940 in this example may receive the one or more matching bots and the selected model from the matching bot determiner 930, and determine a confidence score for each matching bot based on the selected model. The matching bot confidence score determiner 940 may then send the matching bots with their confidence scores to the matching bot ranker 950 for ranking.

The matching bot ranker 950 in this example may receive the matching bots with their confidence scores from the matching bot confidence score determiner 940, and rank the matching bots based on their respective confidence scores. The matching bot ranker 950 can send the ranked matching bots with their confidence scores to the bot switch instruction generator 960 for bot switch instruction generation.

The bot switch instruction generator 960 in this example may receive a list of ranked matching bots with their confidence scores from the matching bot ranker 950. The bot switch instruction generator 960 may also receive a dynamic threshold based on the original reply from the original reply based threshold generator 910. In addition, the bot switch instruction generator 960 may also obtain the bot switch threshold 965. The bot switch threshold 965 may be stored in the conversation bot recommender 540 and determined or updated by an administrator of the system or upon environmental changes of the system.

The bot switch instruction generator 960 may determine whether to instruct a bot switch based on the list of ranked matching bots, their confidence scores, and one or more thresholds. In one example, the bot switch instruction generator 960 may generate an instruction to switch to a top ranked bot in the list regardless of its confidence score or other conditions. In another example, the bot switch instruction generator 960 may generate an instruction to switch to a top ranked bot in the list when its confidence score is higher than the dynamic threshold based on the original reply and/or when the top ranked bot satisfies a condition based on the bot switch threshold 965. For example, the condition may be for the confidence score of the top ranked bot to be higher than the bot switch threshold 965 which may be independent of the original reply; or the condition may be for a bot provider of the top ranked bot to place a bid higher than the bot switch threshold 965.

In yet another example, the bot switch instruction generator 960 may generate an instruction to switch to a bot in the list when the bot satisfies a condition based on the bot switch threshold 965 and has a highest confidence score among the bots in the list that satisfy condition based on the bot switch threshold 965.

In still another example, the bot switch instruction generator 960 may generate an instruction to switch to a bot in the list when the bot satisfies a condition based on the bot switch threshold 965, has a highest confidence score among the bots in the list that satisfy condition based on the bot switch threshold 965, and has a confidence score higher than the dynamic threshold based on the original reply.

The bot switch instruction generator 960 may generate and send the bot switch instruction to the user for the user to determine whether to switch to the recommended bot. In one embodiment, the bot switch instruction generator 960 may send the bot switch instruction to the user request analyzer 510 to automatically redirect the user to the recommended bot.

In one embodiment, when the bot switch instruction generator 960 determines that none of the bots in the list can be qualified for bot switch based on the one or more conditions, the bot switch instruction generator 960 may generate a no-switch instruction, which may be a special case of bot switch instruction, and send the no-switch instruction to the bot reply analyzer 530 for providing the original reply to the user. This may happen when the matching bots in the list have confidence scores lower than the dynamic threshold based on the original reply and/or when the matching bots in the list do not satisfy a condition based on the bot switch threshold 965.

When the bot switch instruction generator 960 determines that none of the bots in the list can be qualified for bot switch, the bot switch instruction generator 960 can instruct the new bot request generator 970 to generate a new bot request.

The new bot request generator 970 in this example may generate a request for new bot generation, upon receiving an instruction from the bot switch instruction generator 960. The new bot request generator 970 can send the request to the new bot generator 560 for generating a new bot based on the query.

Figure 10:
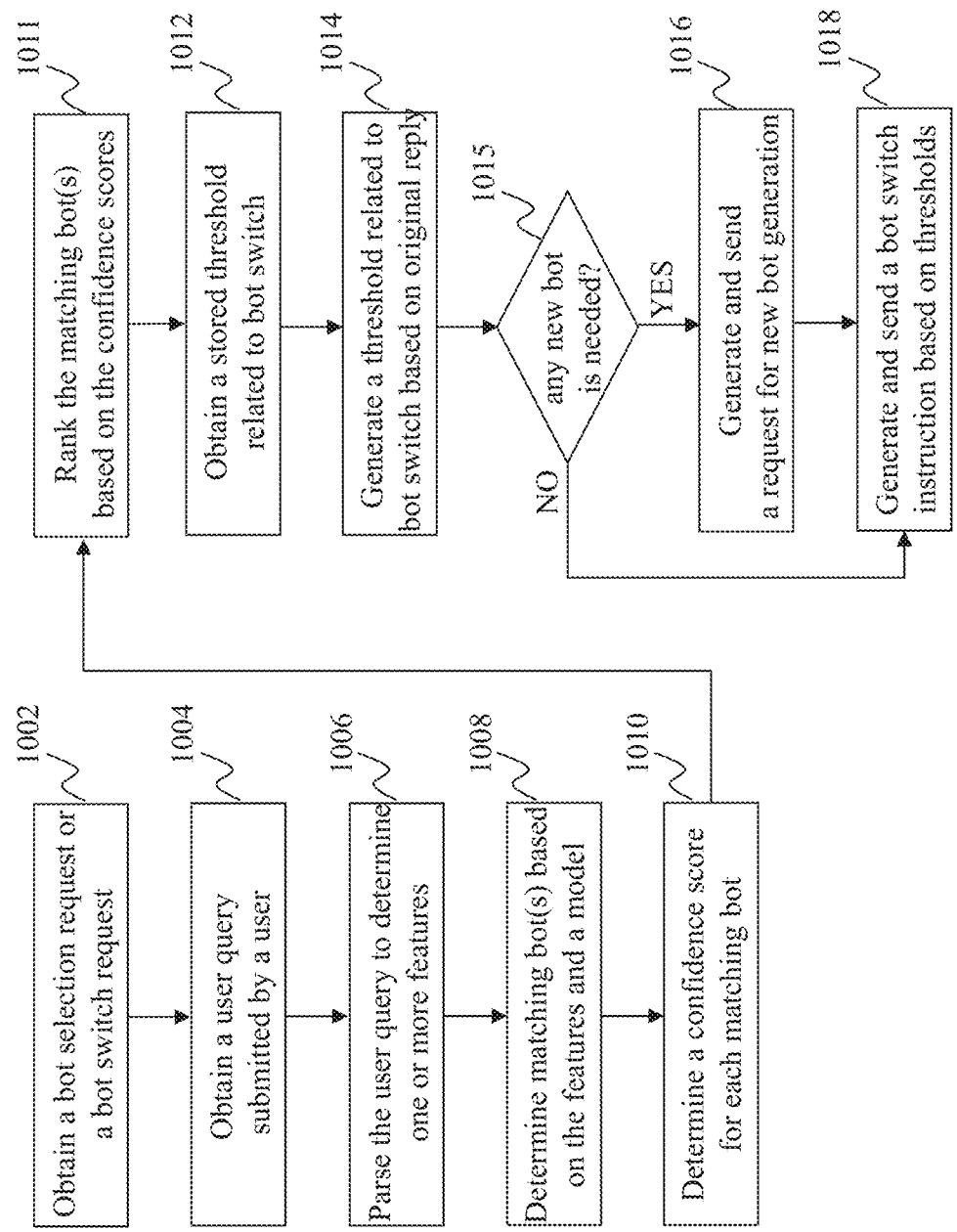
FIG. 10 shows a flowchart of an exemplary process performed by a conversational bot recommender, according to an embodiment of the present teaching.

FIG. 10 shows a flowchart of an exemplary process performed by a conversational bot recommender, e.g. the conversation bot recommender 540 in FIG. 9, according to an embodiment of the present teaching. A bot selection request or a bot switch request is obtained at 1002. A user query submitted by a user is obtained at 1004. The user query is parsed at 1006 to determine one or more features. One or more matching bots are determined at 1008 based on the one or more features and a bot recommendation model. A confidence score is determined at 1010 for each matching bot.

At 1011, the matching bots are ranked based on their respective confidence scores. A stored threshold related to bot switch is obtained at 1012. Another threshold related to bot switch is generated at 1014 based on an original reply to the query.

At 1015, it is determined that whether any new bot generation is needed. A new bot generation may be needed when none of the matching bots meets the conditions based on the thresholds. If a new bot generation is needed, the process moves to 1016 to generate and send a request for new bot generation. If no new bot generation is needed, the process moves to 1018 directly to generate and send a bot switch instruction based on the thresholds. In one embodiment, after 1016, the process moves to 1018 to generate and send a no-switch instruction, a special bot switch instruction, to inform that no bot switch will be performed.

Figure 11:
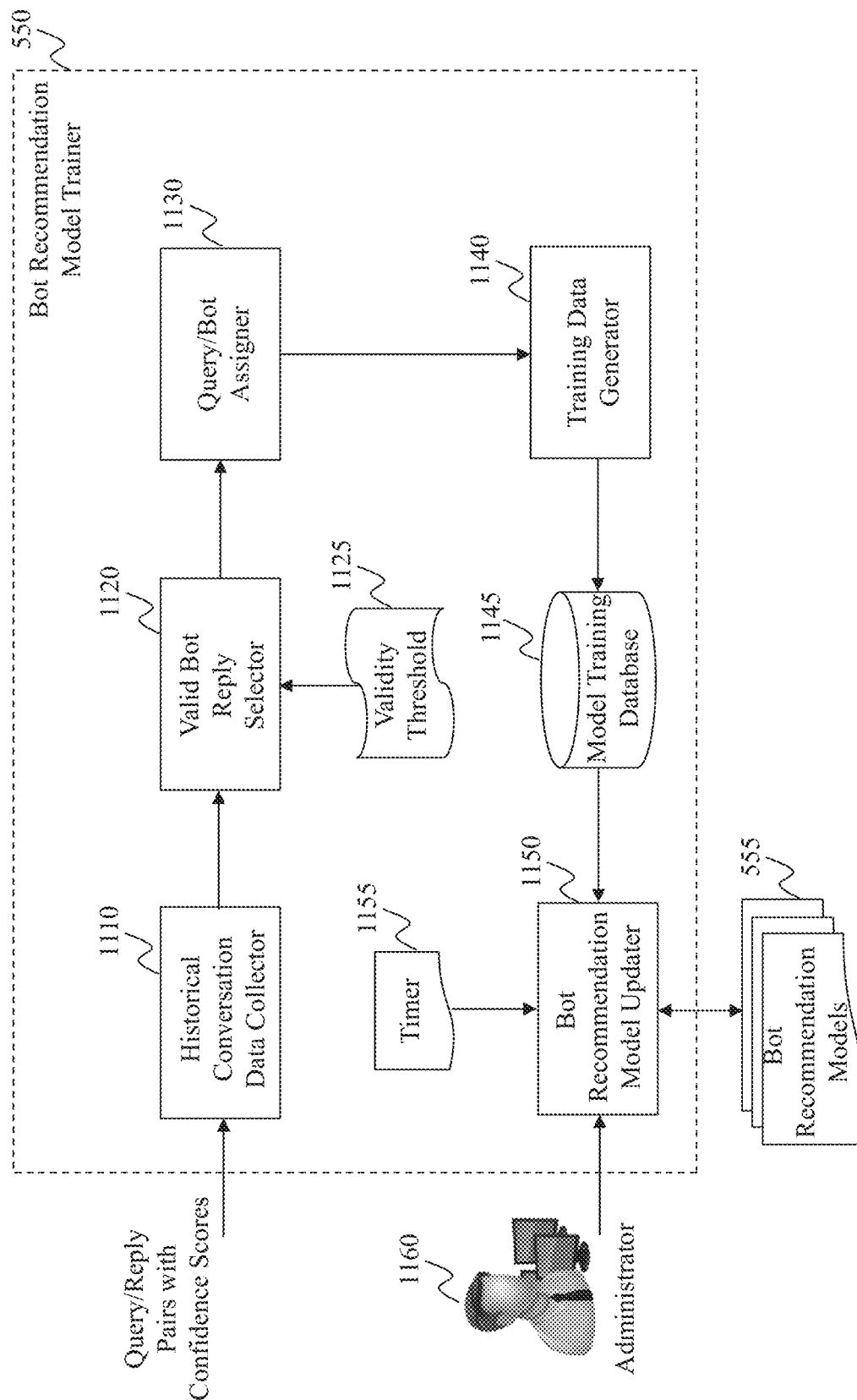
FIG. 11 illustrates an exemplary diagram of a bot recommendation model trainer, according to an embodiment of the present teaching.

FIG. 11 illustrates an exemplary diagram of a bot recommendation model trainer, e.g. the bot recommendation model trainer 550 in FIG. 11, according to an embodiment of the present teaching. As shown in FIG. 11, the bot recommendation model trainer 550 in this example includes a historical conversation data collector 1110, a valid bot reply selector 1120, a validity threshold 1125, a query/bot assigner 1130, a training data generator 1140, a model training database 1145, a bot recommendation model updater 1150, and a timer 1155.

The historical conversation data collector 1110 in this example may obtain query/reply pairs from the bot reply analyzer 530 with some metadata. The metadata may include confidence scores associated with the replies in the pairs and may include information about the conversational bots providing the replies in the pairs. The historical conversation data collector 1110 may send the collected query/reply pairs to the valid bot reply selector 1120 with their respective confidence scores for reply selection.

The valid bot reply selector 1120 in this example may obtain the query/reply pairs from the historical conversation data collector 1110 with their respective confidence scores. The valid bot reply selector 1120 may retrieve the validity threshold 1125 and select one or more pairs with valid bot replies based on the validity threshold 1125 and the confidence scores of the query/reply pairs.

In one embodiment, the collected historical query/reply pairs may be based on replies sent by the bot reply provider 760 with various confidence scores, including confidence scores lower than the confidence threshold 755. In this case, the valid bot reply selector 1120 may utilize the validity threshold 1125 to filter out replies with confidence scores lower than the validity threshold, and hence filter out the pairs including these replies as well. The validity threshold 1125 may or may not be the same as the confidence threshold 755.

In one embodiment, the collected historical query/reply pairs may be based on replies sent by the bot reply provider 760 only with confidence scores higher than the confidence threshold 755. In this case, the valid bot reply selector 1120 may utilize the validity threshold 1125 to further filter out replies with confidence scores lower than the validity threshold, and hence filter out the pairs including these replies as well. The validity threshold 1125 in this case is higher than the confidence threshold 755.

The valid bot reply selector 1120 may select all pairs with replies having confidence scores higher than the validity threshold 1125 and send the selected pairs with some metadata to the query/bot assigner 1130 for query/bot assignment.

The query/bot assigner 1130 in this example may receive the selected pairs with some metadata from the valid bot reply selector 1120. For each query in these pairs, the query/bot assigner 1130 may assign one or more bots to be associated with the query, e.g. based on the metadata. For example, for a pair of <query A, reply B>, where reply B is provided by bot C in response to the query A with a confidence score higher than the validity threshold 1125, the query/bot assigner 1130 can assign the bot C to be associated with the query A. The query/bot assigner 1130 may send information about the queries, their assigned bots, and other related metadata to the training data generator 1140 for training data generation.

The training data generator 1140 in this example may receive information about the queries, their assigned bots, and other related metadata from the query/bot assigner 1130, and generate training data based on the information. For example, the training data may include features extracted from the queries and/or features of the users submitting these queries. The training data generator 1140 can store the generated training data in the model training database 1145 for future training of the bot recommendation models 555.

The bot recommendation model updater 1150 in this example may obtain an instruction from an administrator 1160 or based on the timer 1155. Based on the instruction, the bot recommendation model updater 1150 may update one or more of the bot recommendation models 555. In one example, the administrator 1160 may instruct the bot recommendation model updater 1150 to update a bot recommendation model. In another example, the bot recommendation model updater 1150 can update a bot recommendation model periodically, e.g. once a week, once a day, based on the timer 1155.

The bot recommendation model updater 1150 may retrieve model training data from the model training database 1145 and update or train a bot recommendation model based on the retrieved model training data.

Figure 12:
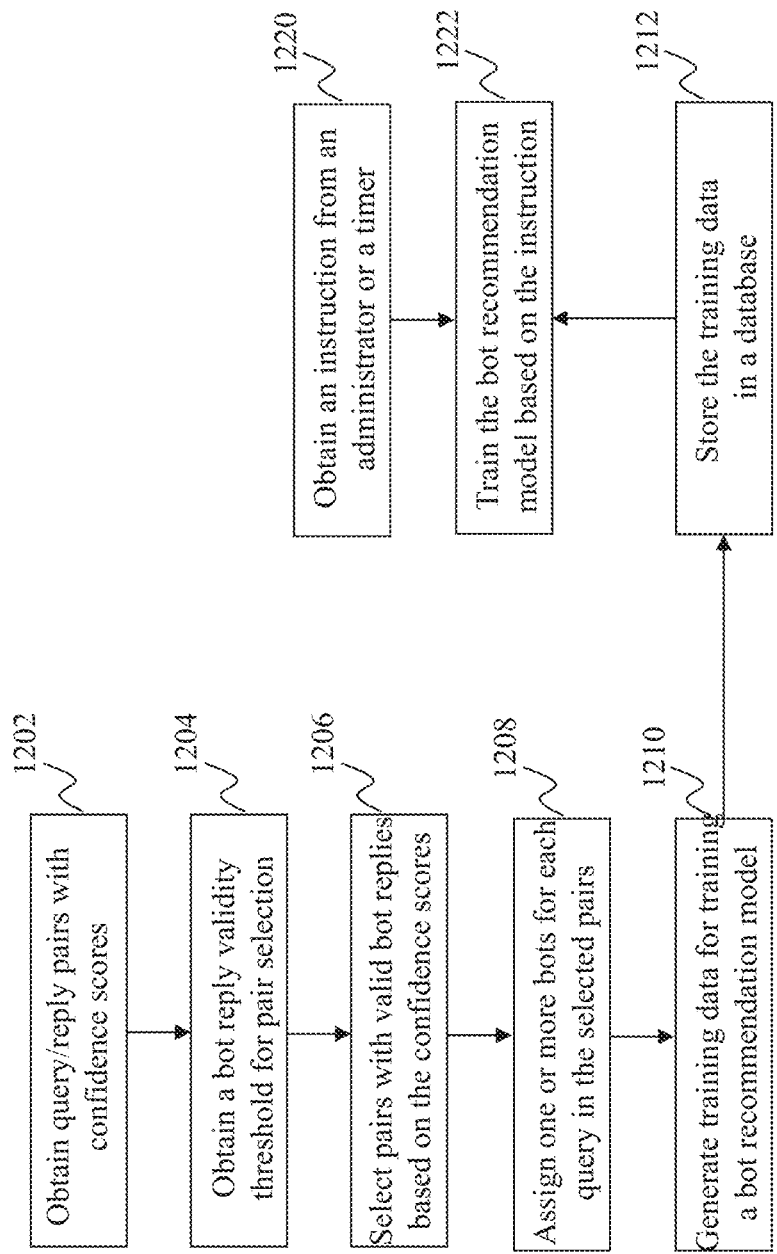
FIG. 12 shows a flowchart of an exemplary process performed by a bot recommendation model trainer, according to an embodiment of the present teaching.

FIG. 12 shows a flowchart of an exemplary process performed by a bot recommendation model trainer, e.g. the bot recommendation model trainer 550 in FIG. 11, according to an embodiment of the present teaching. At 1202, query/reply pairs are obtained with confidence scores. A bot reply validity threshold is obtained at 1204 for pair selection. One or more pairs with valid bot replies are selected at 1206 based on their confidence scores and the validity threshold. One or more bots are assigned at 1208 for each query in the selected pairs. At 1210, training data are generated for training a bot recommendation model. At 1212, the training data are stored in a database.

At 1220, an instruction may be obtained from an administrator or a timer. At 1222, the bot recommendation model is trained based on the instruction.

It can be understood that the order of the steps shown in FIGS. 6, 8, 10, and 12 may be changed according to different embodiments of the present teaching.

Figure 13:
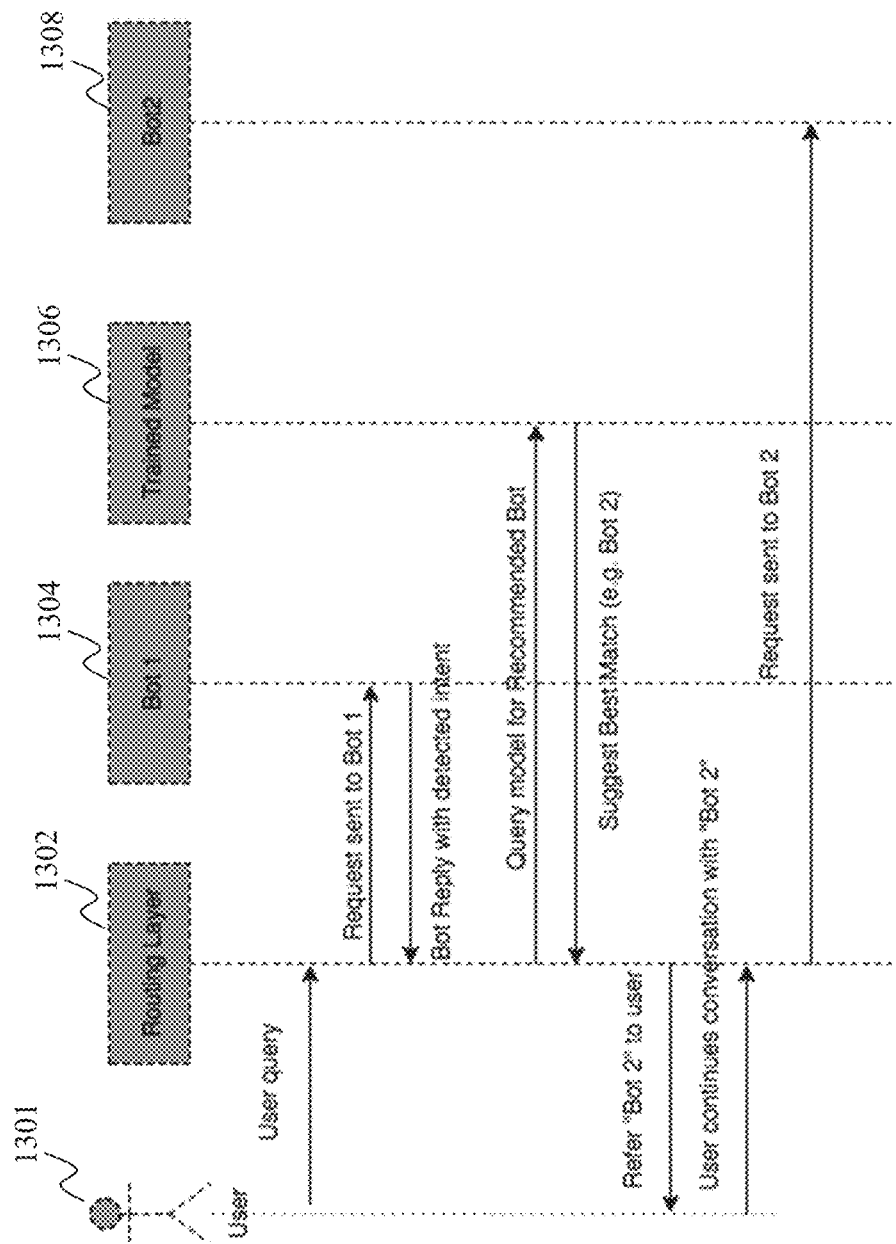
FIG. 13 illustrates an exemplary process performed for facilitating a user-machine conversation, according to an embodiment of the present teaching.

FIG. 13 illustrates an exemplary process performed for facilitating a user-machine conversation, according to an embodiment of the present teaching. As shown in FIG. 13, a routing layer 1302 may facilitate conversations between a user and a bot. For example, after a user 1301 sends a user query to the routing layer 1302, the routing layer 1302 may determine that the user query is directed to a bot 1 1304. The routing layer 1302 can then send a request to the bot 1 1304 for a bot reply, and receive the bot reply from the bot 1 1304 with detected intent. The routing layer 1302 may then determine whether this is a valid or confident bot reply based on the detected intent. When the degree of validity or confidence is lower than a threshold, the routing layer 1302 can query a trained model 1306 for a recommended bot. In this example, the trained model 1306 suggests a best matching bot, bot 2 1308 to the routing layer 1302. The routing layer 1302 may refer the bot 2 to the user 1301, such that the user can continue conversation with the bot 2, via the routing layer 1302.

As discussed before, the routing layer 1302 and the trained model 1306 may be included in the conversational bot routing engine 140, according to one embodiment.

Figure 14:
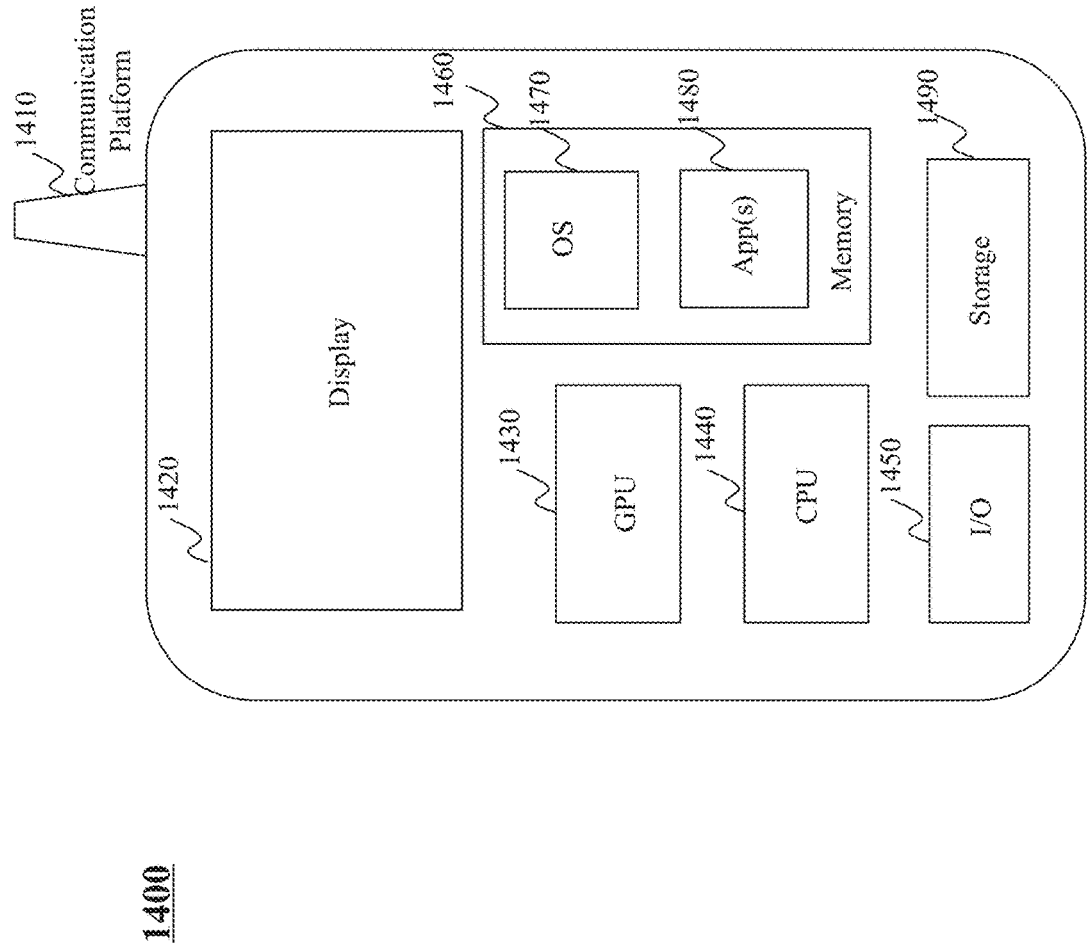
FIG. 14 depicts the architecture of a mobile device which can be used to implement a specialized system incorporating the present teaching.

FIG. 14 depicts the architecture of a mobile device which can be used to realize a specialized system implementing the present teaching. In this example, the user device on which a user interface for a dialog with a conversational bot is presented and interacted-with is a mobile device 1400, including, but is not limited to, a smart phone, a tablet, a music player, a handled gaming console, a global positioning system (GPS) receiver, and a wearable computing device (e.g., eyeglasses, wrist watch, etc.), or in any other form factor. The mobile device 1400 in this example includes one or more central processing units (CPUs) 1440, one or more graphic processing units (GPUs) 1430, a display 1420, a memory 1460, a communication platform 1410, such as a wireless communication module, storage 1490, and one or more input/output (I/O) devices 1450. Any other suitable component, including but not limited to a system bus or a controller (not shown), may also be included in the mobile device 1400. As shown in FIG. 14, a mobile operating system 1470, e.g., iOS, Android, Windows Phone, etc., and one or more applications 1480 may be loaded into the memory 1460 from the storage 1490 in order to be executed by the CPU 1440. The applications 1480 may include a browser or any other suitable mobile apps for receiving responses from the conversational bot on the mobile device 1400. User interactions with the conversational bot, via the conversational bot routing engine 140, may be achieved via the I/O devices 1450 and provided to the conversational bot routing engine 140 and/or other components of systems 100 and 200, e.g., via the network 120.

To implement various modules, units, and their functionalities described in the present disclosure, computer hardware platforms may be used as the hardware platform(s) for one or more of the elements described herein (e.g., the conversational bot routing engine 140, the web/app server 130 and/or other components of systems 100 and 200 described with respect to FIGS. 1-13). The hardware elements, operating systems and programming languages of such computers are conventional in nature, and it is presumed that those skilled in the art are adequately familiar therewith to adapt those technologies about facilitating a guided dialog between a user and a conversational bot as described herein. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

Figure 15:
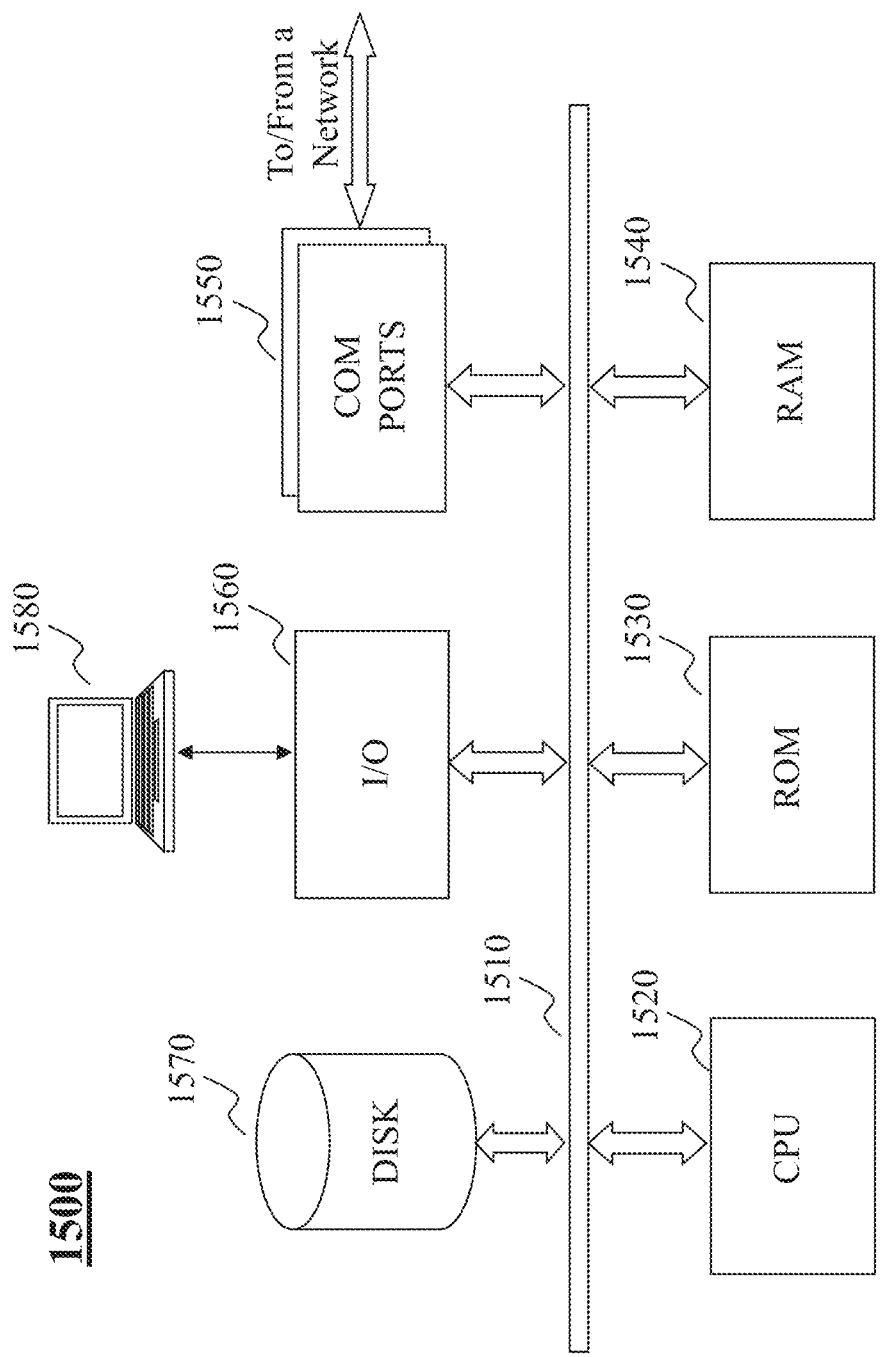
FIG. 15 depicts the architecture of a computer which can be used to implement a specialized system incorporating the present teaching.

FIG. 15 depicts the architecture of a computing device which can be used to realize a specialized system implementing the present teaching. Such a specialized system incorporating the present teaching has a functional block diagram illustration of a hardware platform which includes user interface elements. The computer may be a general purpose computer or a special purpose computer. Both can be used to implement a specialized system for the present teaching. This computer 1500 may be used to implement any component of the techniques of facilitating a user-machine conversation, as described herein. For example, the web/app server 130, the conversational bot routing engine 140, etc., may be implemented on a computer such as computer 1500, via its hardware, software program, firmware, or a combination thereof. Although only one such computer is shown, for convenience, the computer functions relating to facilitating a user-machine conversation as described herein may be implemented in a distributed fashion on a number of similar platforms, to distribute the processing load.

The computer 1500, for example, includes COM ports 1550 connected to and from a network connected thereto to facilitate data communications. The computer 1500 also includes a central processing unit (CPU) 1520, in the form of one or more processors, for executing program instructions. The exemplary computer platform includes an internal communication bus 1510, program storage and data storage of different forms, e.g., disk 1570, read only memory (ROM) 1530, or random access memory (RAM) 1540, for various data files to be processed and/or communicated by the computer, as well as possibly program instructions to be executed by the CPU. The computer 1500 also includes an I/O component 1560, supporting input/output flows between the computer and other components therein such as user interface elements 1580. The computer 1500 may also receive programming and data via network communications.

Hence, aspects of the methods of facilitating a user-machine conversation, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer into the hardware platform(s) of a computing environment or other system implementing a computing environment or similar functionalities in connection with facilitating a user-machine conversation. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, facilitating a user-machine conversation as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method, implemented on a machine having at least one processor, storage, and a communication platform connected to a network for facilitating a user-machine conversation, the method comprising:

obtaining a query from a user, wherein the query is directed to a first conversational bot;

obtaining, from the first conversational bot, a reply in response to the query;
determining a degree of validity of the reply based on the reply and the query;
determining, in the event that the degree of validity of the reply meets a certain criterion, using a model for bot recommendation, a second conversational bot other than the first conversational bot, wherein the second conversational bot is selected from a plurality of conversational bots based on (i) one or more features of the query, (ii) a ranked list of confidence scores, each of which is associated with a corresponding one of the plurality of conversational bots, and (iii) one or more thresholds determined based on the reply, wherein the model is trained based on training data comprising historical query-reply pairs, each of which includes (i) a historical query from a conversational bot with an associated confidence score, and (ii) a historical reply corresponding to the historical query, wherein:
one or more of the historical query-reply pairs are selected based on their respective associated confidence scores and a threshold, and
one or more of the plurality of conversational bots handled the historical query in each of the historical query-reply pairs and provided a historical reply corresponding to the historical query, and
the training data is generated based on the historical query-reply pairs; and
directing the user-machine conversation to the second conversational bot with the query.

2. The method of claim 1, wherein determining the degree of validity comprises:
determining a degree of matching between the reply and the query based on their semantic meanings;
obtaining a first confidence score related to the reply from the first conversational bot; and
determining the degree of validity of the reply based on the degree of matching and the first confidence score.

3. The method of claim 1, further comprising:
comparing the degree of validity with the threshold, wherein the certain criterion comprises the degree of validity not exceeding the threshold;
providing the reply as a response to the query and providing the query and the reply for training the model for bot recommendation, when the degree of validity exceeds the threshold; and
determining the second conversational bot when the degree of validity does not exceed the threshold, indicating that the certain criterion has been met.

4. The method of claim 1, wherein determining the second conversational bot comprises:
parsing the query to determine the one or more features when the reply meets the certain criterion; and
obtaining the model for bot recommendation.

5. The method of claim 4, wherein the plurality of conversational bots are further determined based on the model, the method further comprises:
obtaining, for each of the plurality of conversational bots, the respective confidence score, wherein the ranked list of confidence scores is determined by:
ranking the plurality of conversational bots based on their respective confidence scores.

6. The method of claim 5, further comprising:
generating a new conversational bot based on the query when none of the confidence scores of the plurality of conversational bots passes the one or more thresholds.

7. The method of claim 1, further comprising:
providing a recommendation of the second conversational bot to the user as a response to the query.

8. The method of claim 1, wherein the first conversational bot and the second conversational bot are independent and related to different topics, wherein the topics include at least one of: weather, restaurant, hotel, travel, sports, finance, or news.

9. A system, having at least one processor, storage, and a communication platform connected to a network for facilitating a user-machine conversation, comprising:
a user request analyzer configured for obtaining a query from a user, wherein the query is directed to a first conversational bot;
a bot reply analyzer configured for obtaining, from the first conversational bot, a reply in response to the query and determining a degree of validity of the reply based on the reply and the query;
a conversational bot recommender configured for determining, in the event that the degree of validity of the reply meets a certain criterion, using a model for bot recommendation, a second conversational bot other than the first conversational bot, wherein the second conversational bot is selected from a plurality of conversational bots based on (i) one or more features of the query, (ii) a ranked list of confidence scores, each of which is associated with a corresponding one of the plurality of conversational bots, and (iii) one or more thresholds determined based on the reply, wherein the model is trained based on training data comprising historical query-reply pairs, each of which includes (i) a historical query from a conversational bot with an associated confidence score, and (ii) a historical reply corresponding to the historical query, wherein:
one or more of the historical query-reply pairs are selected based on their respective associated confidence scores and a threshold, and
one or more of the plurality of conversational bots handled the historical query in each of the historical query-reply pairs and provided a historical reply corresponding to the historical query, and
the training data is generated based on the historical query-reply pairs; and
a conversational bot determiner configured for directing the user-machine conversation to the second conversational bot with the query.

10. The system of claim 9, wherein the bot reply analyzer comprises:
a query/reply semantic matcher configured for determining a degree of matching between the reply and the query based on their semantic meanings;
a reply confidence score determiner configured for obtaining a first confidence score related to the reply from the first conversational bot; and
a bot switch request generator configured for determining the degree of validity of the reply based on the degree of matching and the first confidence score.

11. The system of claim 9, wherein:
the bot reply analyzer is further configured for:
comparing the degree of validity with the threshold, wherein the certain criterion comprises the degree of validity not exceeding the threshold, and
providing the reply as a response to the query and providing the query and the reply for training the model for bot recommendation, when the degree of validity exceeds the threshold; and the second conversational bot is determined when the degree of validity does not exceed the threshold, indicating that the certain criterion has been met.

12. The system of claim 9, wherein the conversational bot recommender comprises:
a user query parser configured for parsing the query to determine the one or more features when the reply meets the certain criterion;
a matching bot determiner configured for obtaining the model for bot recommendation; and
a bot switch instruction generator configured for determining the second conversational bot based on the one or more features, the ranked list of confidence scores associated with the plurality of conversational bots, the one or more thresholds determined based on the reply, and the model.

13. The system of claim 12, wherein the plurality of conversational bots are further determined based on the model, the conversational bot recommender comprises:
a matching bot confidence score determiner configured for obtaining, for each of the plurality of conversational bots, a respective confidence score;
a matching bot ranker configured for ranking the plurality of conversational bots based on their respective confidence scores to obtain the ranked list of confidence scores; and
an original reply based threshold generator configured for determining the one or more thresholds based on the reply, wherein:
the bot switch instruction generator configured for selecting the second conversational bot from the plurality of conversational bots.

14. The system of claim 13, further comprising:
a new bot generator configured for generating a new conversational bot based on the query when none of the confidence scores of the plurality of conversational bots passes the one or more thresholds.

15. A non-transitory machine-readable medium having information recorded thereon for facilitating a user-machine conversation, wherein the information, when read by a machine, causes the machine to perform operations comprising:
obtaining a query from a user, wherein the query is directed to a first conversational bot;
obtaining, from the first conversational bot, a reply in response to the query;
determining a degree of validity of the reply based on the reply and the query;
determining, in the event that the degree of validity of the reply meets a certain criterion, using a model for bot recommendation, a second conversational bot other than the first conversational bot, wherein the second conversational bot is selected from a plurality of conversational bots based on (i) one or more features of the query, (ii) a ranked list of confidence scores, each of which is associated with a corresponding one of the plurality of conversational bots, and (iii) one or more thresholds determined based on the reply, wherein the model is trained based on training data comprising historical query-reply pairs, each of which includes (i) a historical query from a conversational bot with an associated confidence score, and (ii) a historical reply corresponding to the historical query, wherein:
one or more of the historical query-reply pairs are selected based on their respective associated confidence scores and a threshold, and
one or more of the plurality of conversational bots handled the historical query in each of the historical query-reply pairs and provided a historical reply corresponding to the historical query, and
the training data is generated based on the historical query-reply pairs; and
directing the user-machine conversation to the second conversational bot with the query.

16. The medium of claim 15, wherein determining the degree of validity comprises:
determining a degree of matching between the reply and the query;
obtaining a first confidence score related to the reply from the first conversational bot; and
determining the degree of validity of the reply based on the degree of matching and the first confidence score.

17. The medium of claim 15, wherein the operations further comprise:
comparing the degree of validity with the threshold, wherein the certain criterion comprises the degree of validity not exceeding the threshold;
providing the reply as a response to the query and providing the query and the reply for training the model for bot recommendation, when the degree of validity exceeds the threshold; and
determining the second conversational bot when the degree of validity does not exceed the threshold, indicating that the certain criterion has been met.

18. The medium of claim 15, wherein determining the second conversational bot comprises:
parsing the query to determine the one or more features when the reply meets the certain criterion; and
obtaining the model for bot recommendation.

19. The medium of claim 18, wherein the plurality of conversational bots are further determined based on the model, the operations further comprise:
obtaining, for each of the plurality of conversational bots, a respective confidence score, wherein the ranked list of confidence scores is determined by:
ranking the plurality of conversational bots based on their respective confidence scores to obtain the ranked list of confidence scores.

* * * * *